US009189322B2

(12) United States Patent
Sakaue

(10) Patent No.: US 9,189,322 B2
(45) Date of Patent: Nov. 17, 2015

(54) MEMORY SYSTEM

(71) Applicant: Kabushiki Kaisha Toshiba, Tokyo (JP)

(72) Inventor: Kenji Sakaue, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 190 days.

(21) Appl. No.: 13/803,803

(22) Filed: Mar. 14, 2013

(65) Prior Publication Data

US 2014/0068379 A1 Mar. 6, 2014

Related U.S. Application Data

(60) Provisional application No. 61/695,386, filed on Aug. 31, 2012.

(51) Int. Cl.
*G06F 11/10* (2006.01)

(52) U.S. Cl.
CPC ............ *G06F 11/10* (2013.01); *G06F 11/1012* (2013.01)

(58) Field of Classification Search
CPC . G06F 11/10; G06F 11/1012; G06F 11/1072; G11C 11/5628; G11C 16/0483; G11C 29/00; G11C 2211/5641; G11C 16/10; H01L 27/11521
USPC ........ 714/764, 755, 786; 365/185.03, 185.09, 365/185.18; 257/315, E29.3
See application file for complete search history.

(56) References Cited

U.S. PATENT DOCUMENTS

2007/0130496 A1 6/2007 Kanno
2008/0301532 A1 12/2008 Uchikawa et al.
2010/0080056 A1* 4/2010 Shiga ....................... 365/185.03

FOREIGN PATENT DOCUMENTS

JP 10-11980 1/1998
JP 2007-157239 6/2007
JP 2008-77810 4/2008

* cited by examiner

*Primary Examiner* — Guy Lamarre
(74) *Attorney, Agent, or Firm* — Oblon, McClelland, Maier & Neustadt, L.L.P.

(57) ABSTRACT

According to one embodiment, a memory module which includes a plurality of nonvolatile memory cells with a plurality of pages and line-and-space word lines to which more than one of the memory cells are connected, and a controller which receives write data from a host device.

5 Claims, 17 Drawing Sheets

200
100
100a
106
Table memory
109
103
CPU
104
BUS
Flash memory
Host device
105
Instruction table memory
Host I/F
Memory buffer
Flash I/F
ECC
101
102
108
207

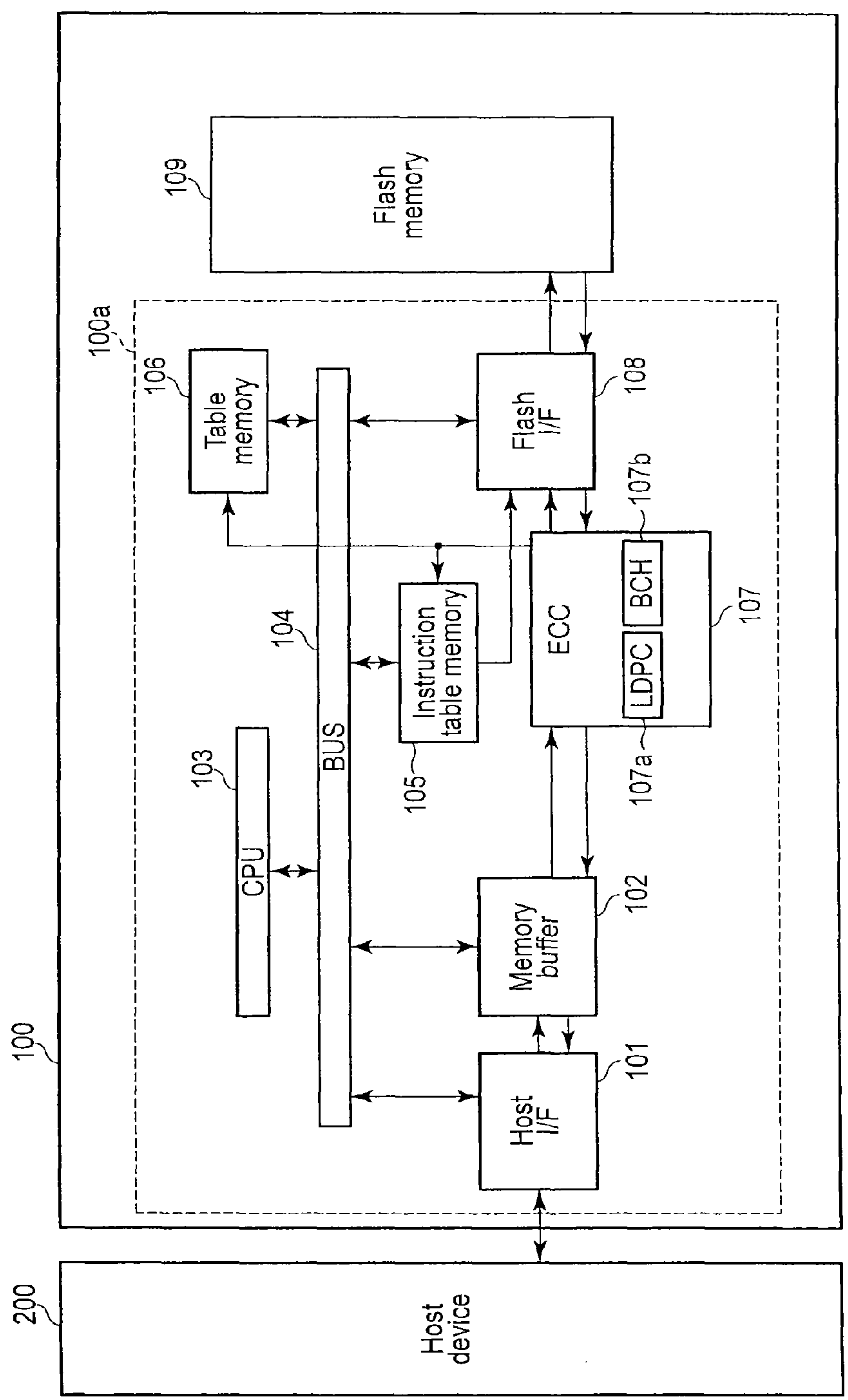
F I G. 1

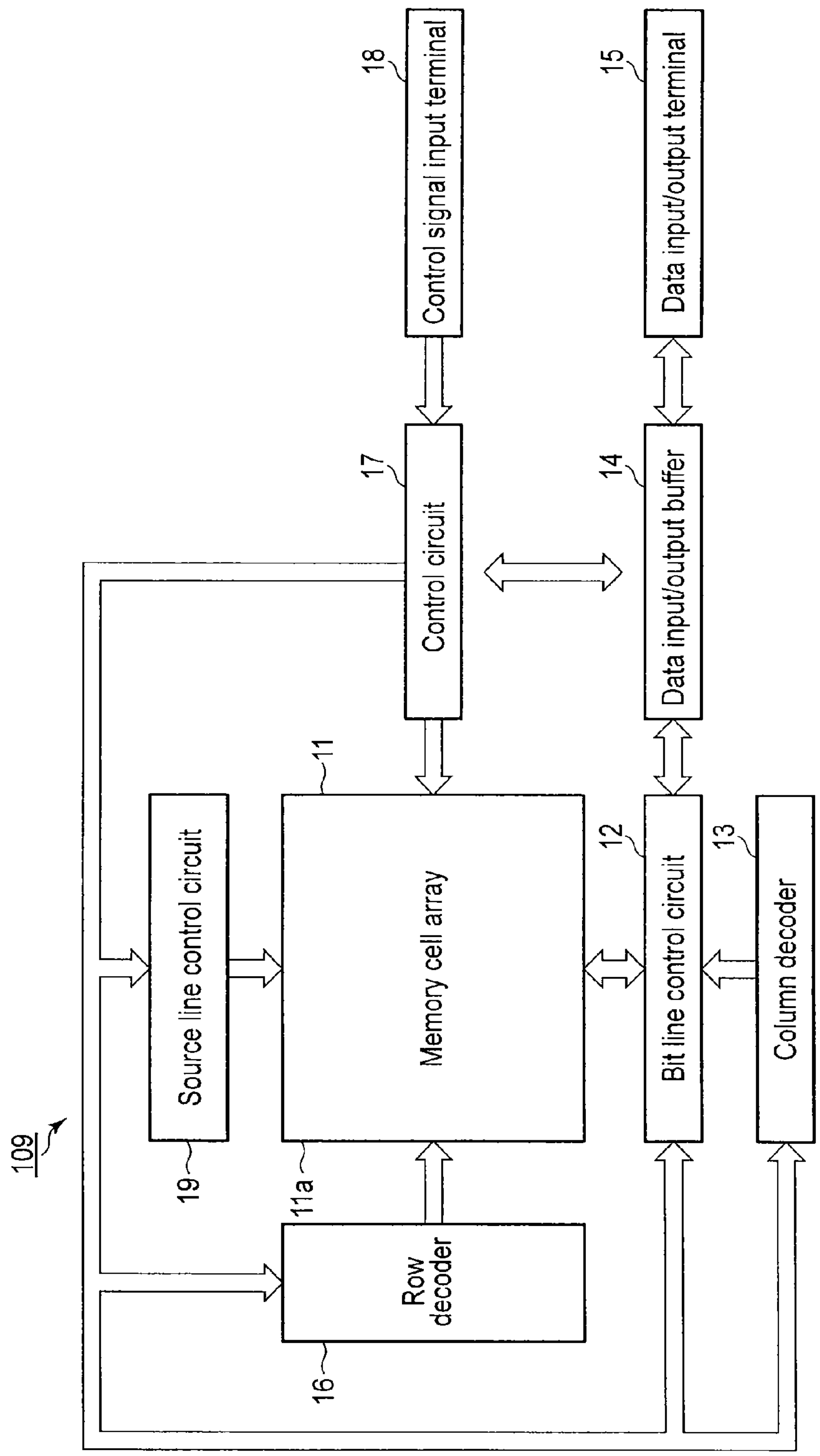
F I G. 2

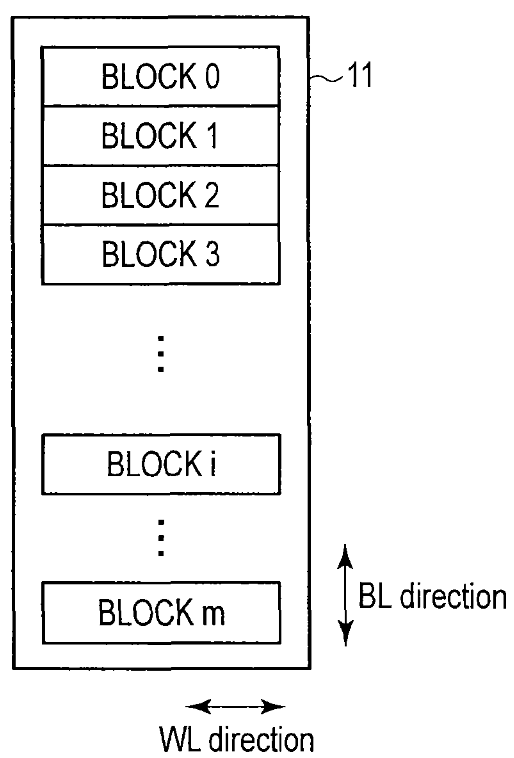
F I G. 3

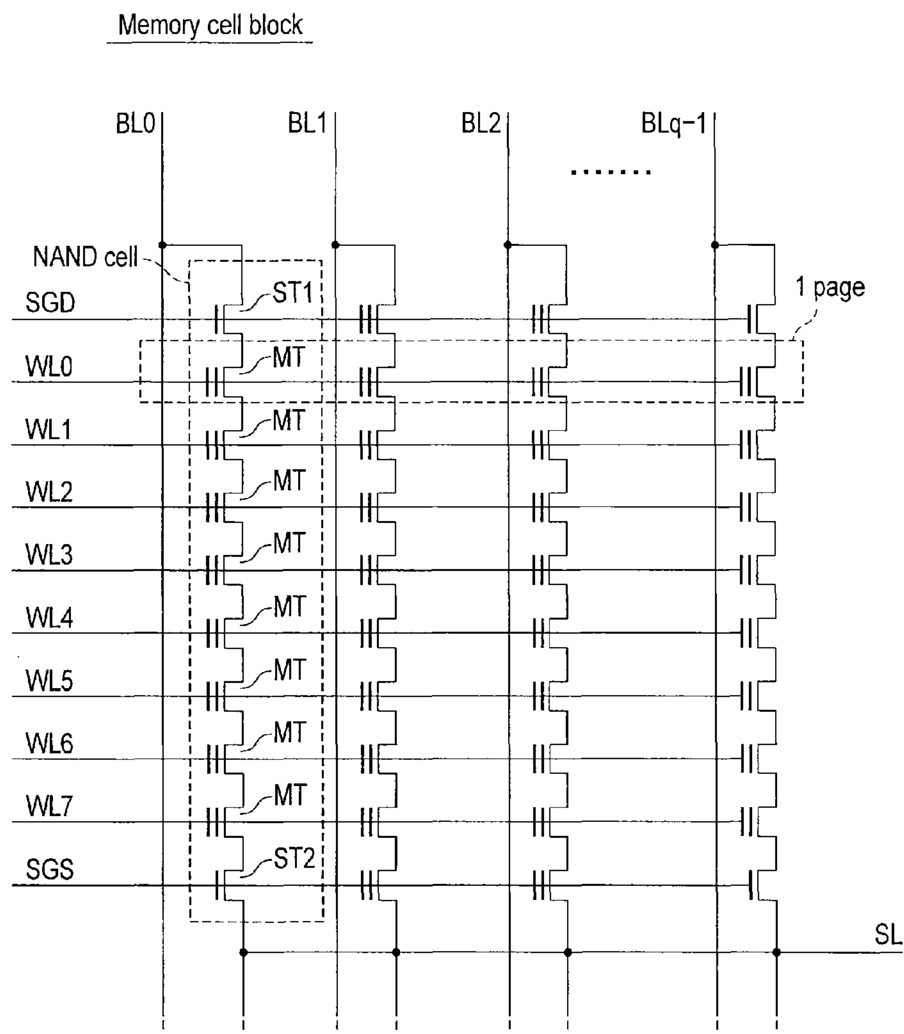
F I G. 4

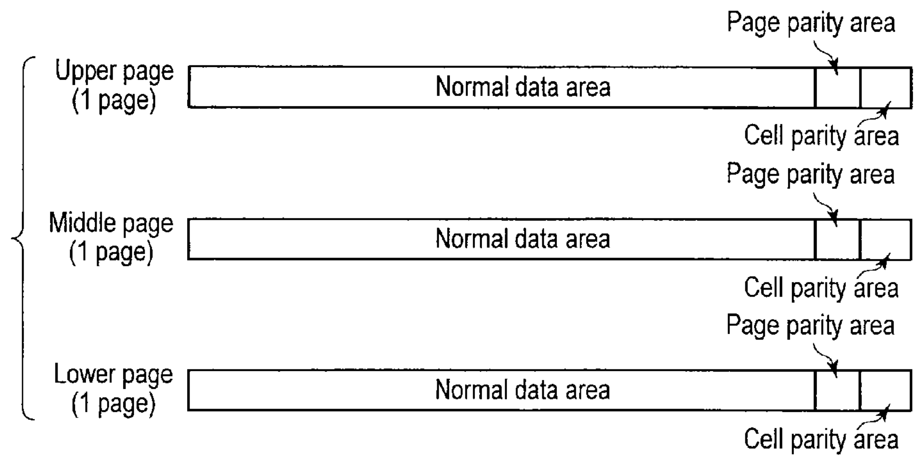
F I G. 5
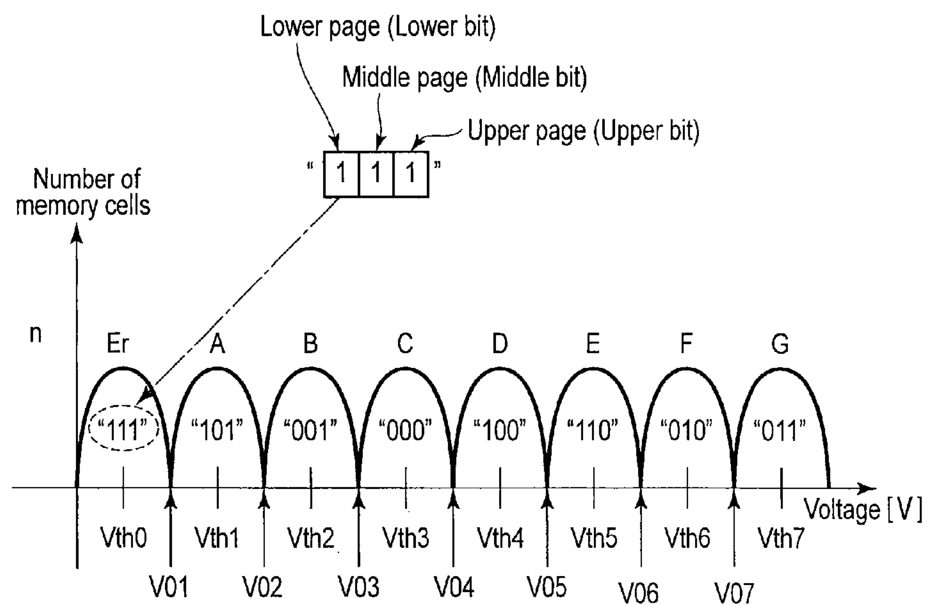
F I G. 6

| Area number | 0 | | | 1 | | | | | 2 | | | | | 3 | | | | | 4 | | | | | 5 | | | | | 6 | | | | | 7 | | | Area number |
|---|---|---|---|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | |
| L | 1 | | | 1 | | | | | 0 | | | | | 0 | | | | | 1 | | | | | 1 | | | | | 0 | | | | | 0 | | | L |
| M | 1 | | | 0 | | | | | 0 | | | | | 0 | | | | | 0 | | | | | 1 | | | | | 1 | | | | | 1 | | | M |
| U | 1 | | | 1 | | | | | 1 | | | | | 0 | | | | | 0 | | | | | 0 | | | | | 0 | | | | | 1 | | | U |
| SB1 | 1 | 1 | 0 | 0 | 1 | 1 | 1 | 0 | 0 | 1 | 1 | 1 | 0 | 0 | 1 | 1 | 1 | 0 | 0 | 1 | 1 | 1 | 0 | 0 | 1 | 1 | 1 | 0 | 0 | 1 | 1 | 1 | 0 | 0 | 1 | 1 | SB1 |
| SB2 | 1 | 0 | 0 | 0 | 0 | 0 | 1 | 1 | 1 | 1 | 1 | 0 | 0 | 0 | 0 | 0 | 1 | 1 | 1 | 1 | 1 | 0 | 0 | 0 | 0 | 0 | 1 | 1 | 1 | 1 | 1 | 0 | 0 | 0 | 0 | 0 | SB2 |
| SB3 | 1 | 1 | 1 | 1 | 1 | 0 | 0 | 0 | 0 | 0 | 1 | 1 | 1 | 1 | 1 | 0 | 0 | 0 | 0 | 0 | 1 | 1 | 1 | 1 | 1 | 1 | 0 | 0 | 0 | 0 | 1 | 1 | 1 | 1 | 1 | 0 | SB3 |
| LLR-L | -12 | -8 | -8 | -8 | -8 | -12 | -9 | -8 | -8 | -9 | -12 | -9 | -8 | -8 | -8 | -8 | -2 | -1 | 1 | 2 | 8 | 8 | 8 | 8 | 8 | 12 | 9 | 8 | 8 | 9 | 12 | 8 | 8 | 8 | 8 | 12 | LLR-L |
| LLR-M | -12 | -8 | -8 | -8 | -8 | -7 | -3 | -1 | 1 | 3 | 7 | 8 | 8 | 8 | 8 | 11 | 9 | 9 | 9 | 9 | 11 | 8 | 8 | 8 | 8 | 7 | 3 | 1 | -1 | -3 | -7 | -8 | -8 | -8 | -8 | -12 | LLR-M |
| LLR-U | -8 | -3 | -1 | 1 | 2 | 8 | 9 | 8 | 8 | 9 | 8 | 3 | 1 | -1 | -3 | -8 | -9 | -9 | -9 | -9 | -8 | -3 | -1 | 1 | 3 | 8 | 9 | 8 | 8 | 9 | 8 | 3 | 1 | -1 | -3 | -3 | LLR-U |
| Code | 0 | | | 1 | | | | | 0 | | | | | 1 | | | | | 0 | | | | | 1 | | | | | 0 | | | | | 1 | | | Code |

Corresponding to each bit in code word
H1
| | | n1 | n2 | n3 | n4 | n5 | n6 | |
|---|---|---|---|---|---|---|---|---|
| Row weight 3 | | 1 | 1 | 0 | 1 | 0 | 0 | m1 |
| | | 0 | 1 | 0 | 0 | 1 | 1 | m2 |
| | H = | 1 | 0 | 1 | 0 | 0 | 1 | m3 |
| | | 0 | 0 | 1 | 1 | 1 | 0 | m4 |
Column weight 2
Corresponding to each parity check
F I G. 8
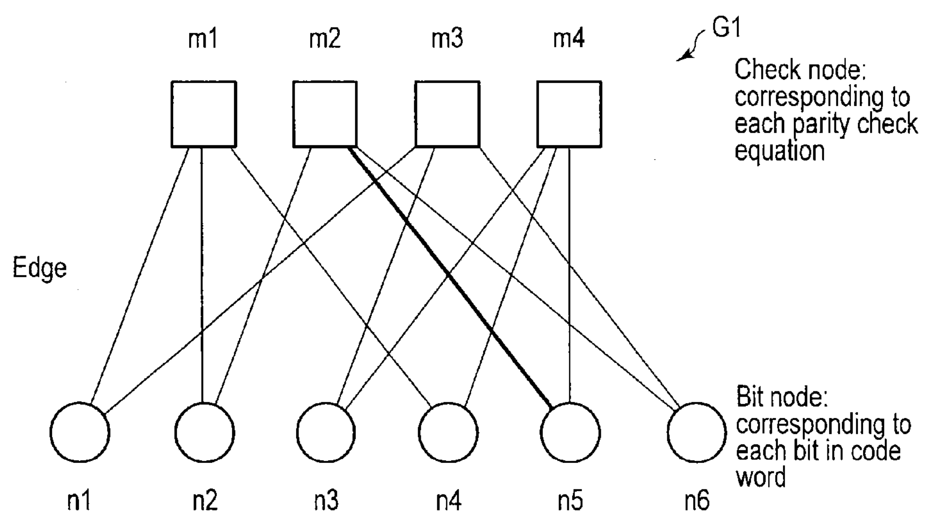
F I G. 9

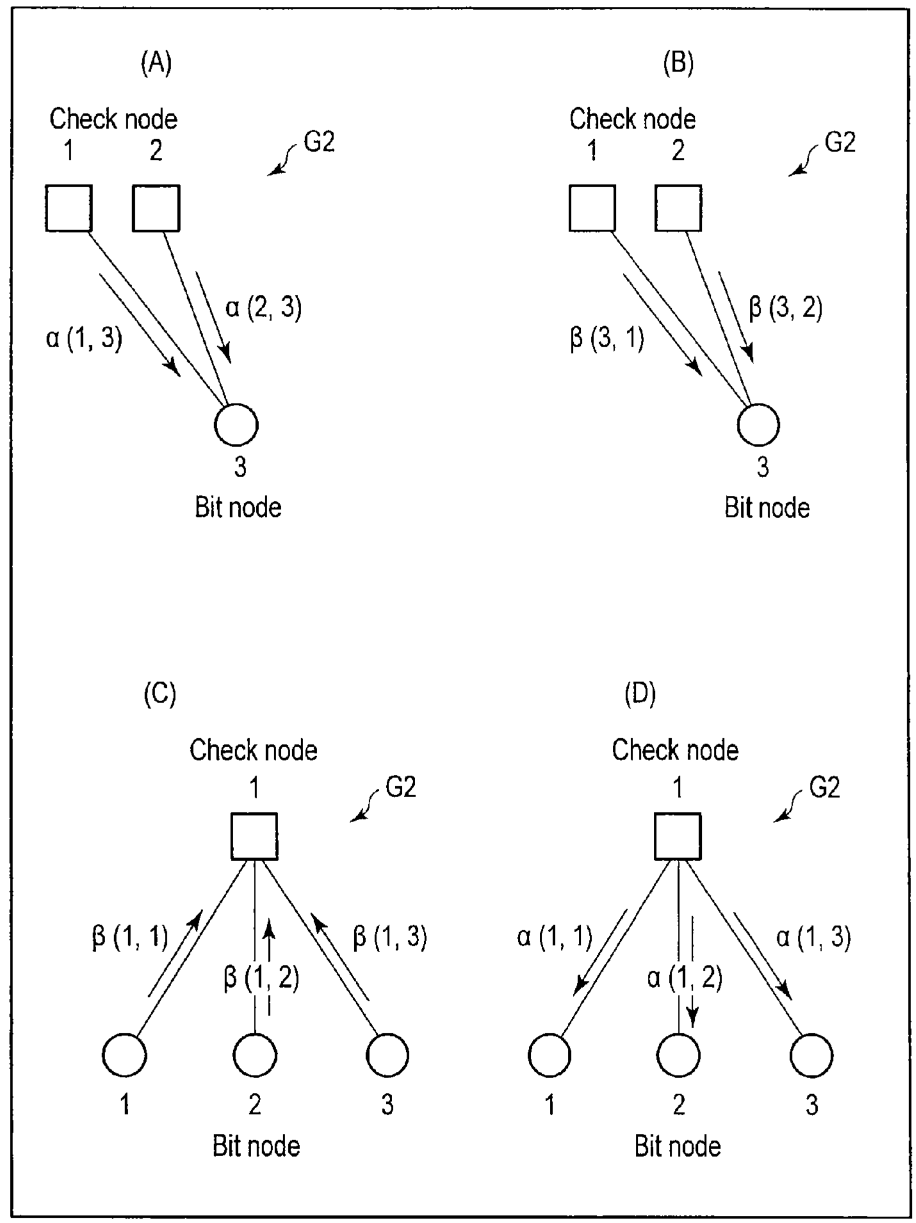
F I G. 1 0

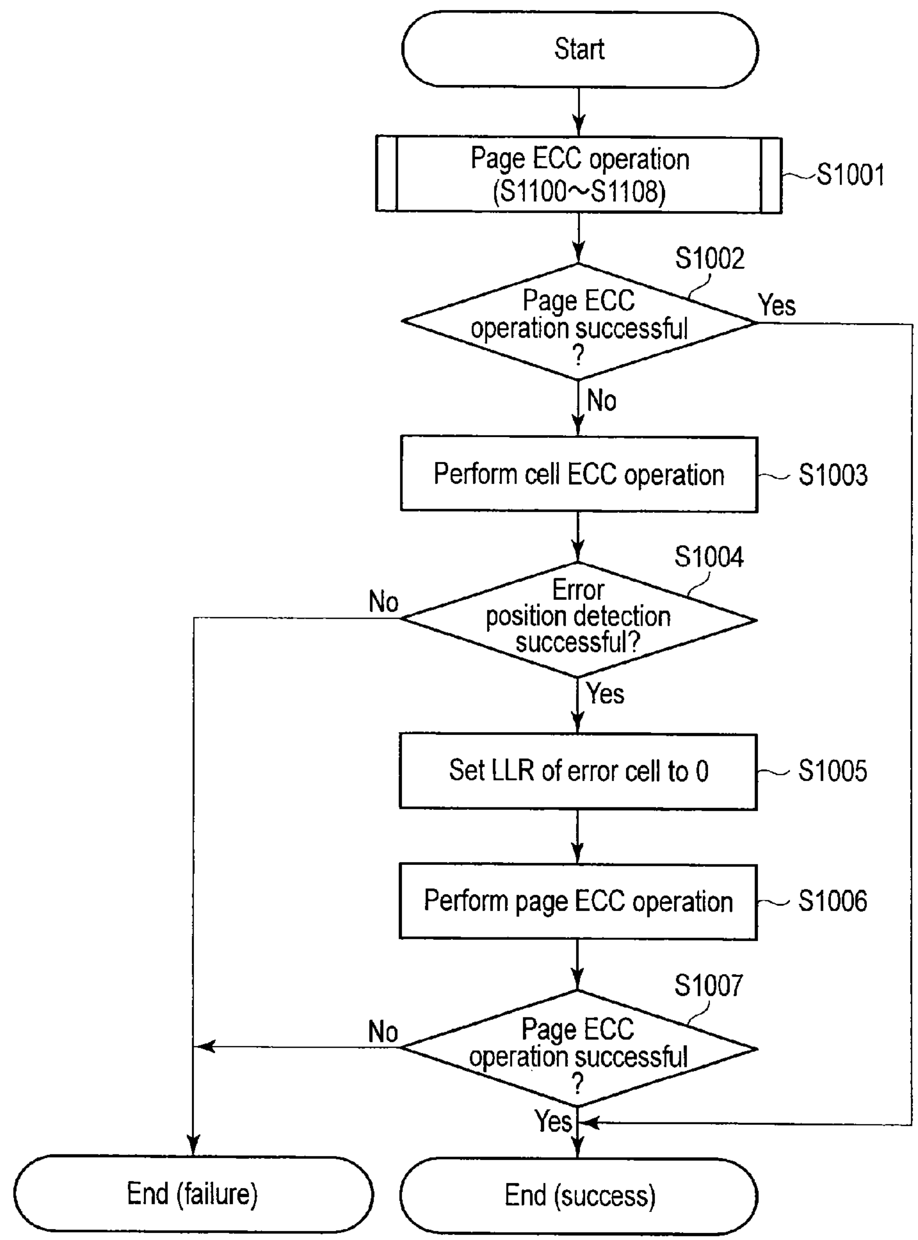
F I G. 1 1

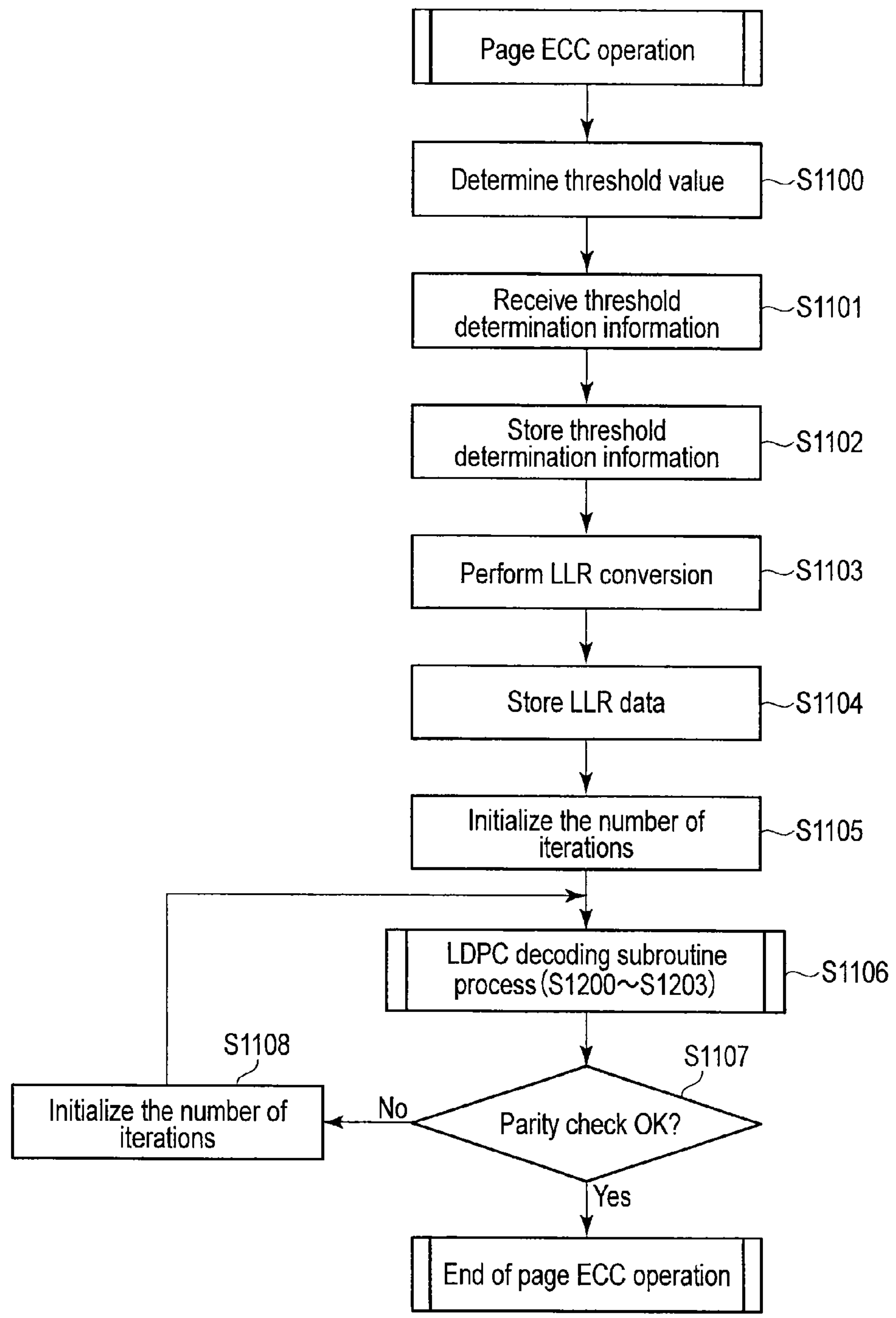
F I G. 1 2

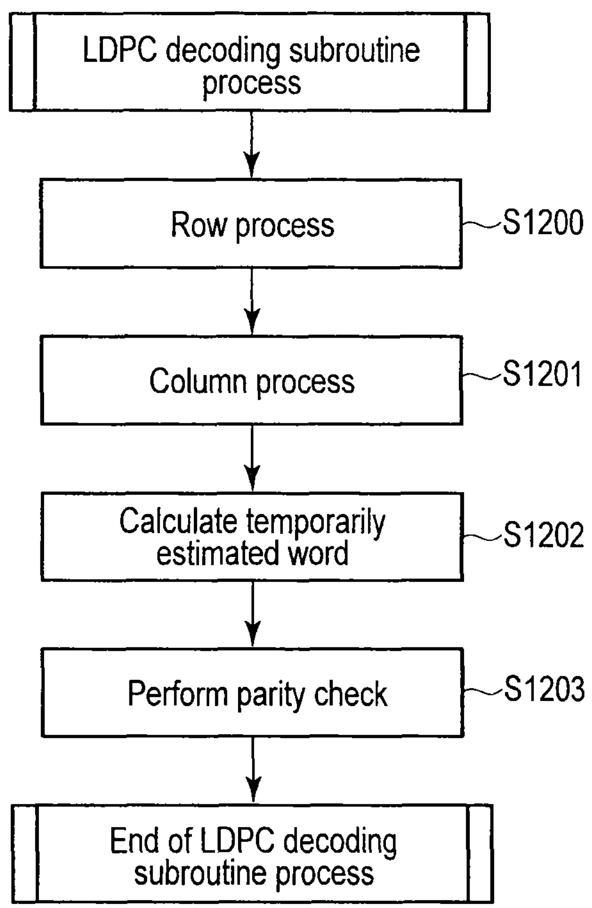
F I G. 1 3

| Area number | | L | M | U | SB1 | SB2 | SB3 | LLR-L | LLR-M | LLR-U | Code |
|---|---|---|---|---|---|---|---|---|---|---|---|
| 0 | 1 | 1 | 1 | 1 | 1 | 1 | 1 | -12 | -12 | -8 | 0 |
| | 2 | | | | 1 | 0 | 1 | -8 | -8 | -3 | |
| | 3 | | | | 0 | 0 | 1 | -8 | -8 | -1 | |
| 1 | 4 | 1 | 0 | 1 | 0 | 0 | 1 | -8 | -8 | 1 | 1 |
| | 5 | | | | 1 | 0 | 1 | -8 | -8 | 2 | |
| | 6 | | | | 1 | 0 | 0 | -12 | -7 | 8 | |
| | 7 | | | | 1 | 1 | 0 | -9 | -3 | 9 | |
| | 8 | | | | 0 | 1 | 0 | -8 | -1 | 8 | |
| 2 | 9 | 0 | 0 | 1 | 0 | 1 | 0 | -8 | 1 | 8 | 0 |
| | 10 | | | | 1 | 1 | 0 | -9 | 3 | 9 | |
| | 11 | | | | 1 | 1 | 1 | -12 | 7 | 8 | |
| | 12 | | | | 1 | 0 | 1 | -9 | 8 | 3 | |
| | 13 | | | | 0 | 0 | 1 | -8 | 8 | 1 | |
| 3 | 14 | 0 | 0 | 0 | 0 | 0 | 1 | -8 | 8 | -1 | 1 |
| | 15 | | | | 1 | 0 | 1 | -8 | 8 | -3 | |
| | 16 | | | | 1 | 0 | 0 | -8 | 11 | -8 | |
| | 17 | | | | 1 | 1 | 0 | -2 | 9 | -9 | |
| | 18 | | | | 0 | 1 | 0 | -1 | 9 | -9 | |
| 4 | 19 | 1 | 0 | 0 | 0 | 1 | 0 | 1 | 9 | -9 | 0 |
| | 20 | | | | 1 | 1 | 0 | 2 | 9 | -9 | |
| | 21 | | | | 1 | 1 | 1 | 8 | 11 | -8 | |
| | 22 | | | | 1 | 0 | 1 | 8 | 8 | -3 | |
| | 23 | | | | 0 | 0 | 1 | 8 | 8 | -1 | |
| 5 | 24 | 1 | 1 | 0 | 0 | 0 | 1 | 8 | 8 | 1 | 1 |
| | 25 | | | | 1 | 0 | 1 | 8 | 8 | 3 | |
| | 26 | | | | 1 | 0 | 1 | 12 | 7 | 8 | |
| | 27 | | | | 1 | 1 | 0 | 9 | 3 | 9 | |
| | 28 | | | | 0 | 1 | 0 | 8 | 1 | 8 | |
| 6 | 29 | 0 | 1 | 0 | 0 | 1 | 0 | 8 | -1 | 8 | 0 |
| | 30 | | | | 1 | 1 | 0 | 9 | -3 | 9 | |
| | 31 | | | | 1 | 1 | 1 | 12 | -7 | 8 | |
| | 32 | | | | 1 | 0 | 1 | 8 | -8 | 3 | |
| | 33 | | | | 0 | 0 | 1 | 8 | -8 | 1 | |
| 7 | 34 | 0 | 1 | 1 | 0 | 0 | 1 | 8 | -8 | -1 | 1 |
| | 35 | | | | 1 | 0 | 1 | 8 | -8 | -3 | |
| | 36 | | | | 1 | 0 | 0 | 12 | -12 | -3 | |

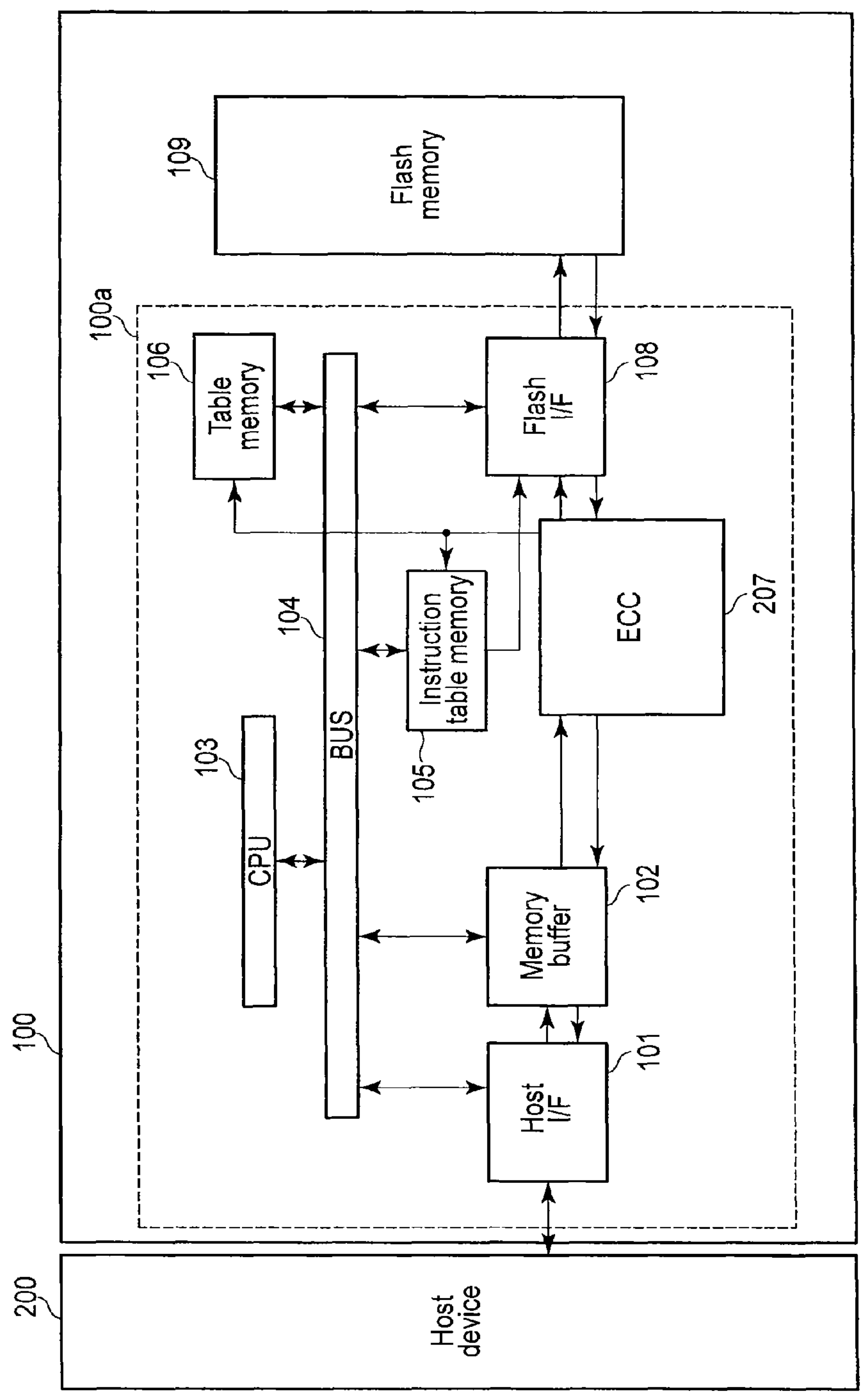
F I G. 1 5

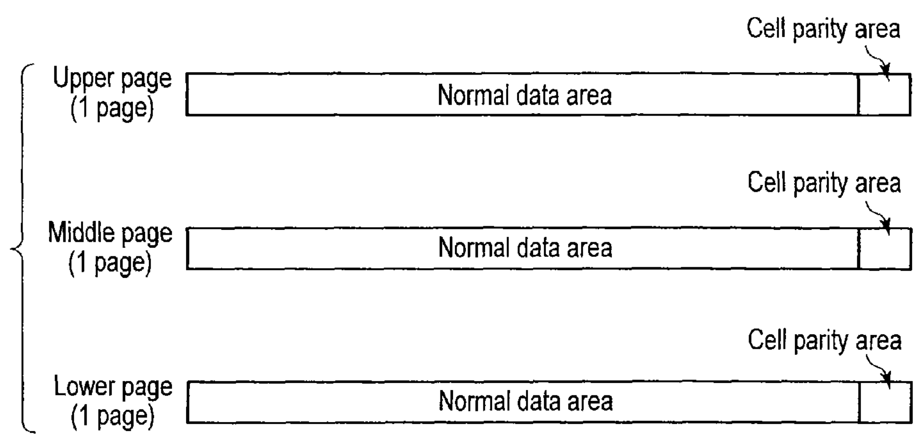
F I G. 1 6
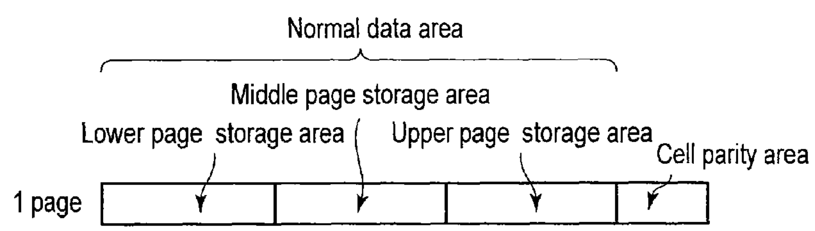
F I G. 2 0

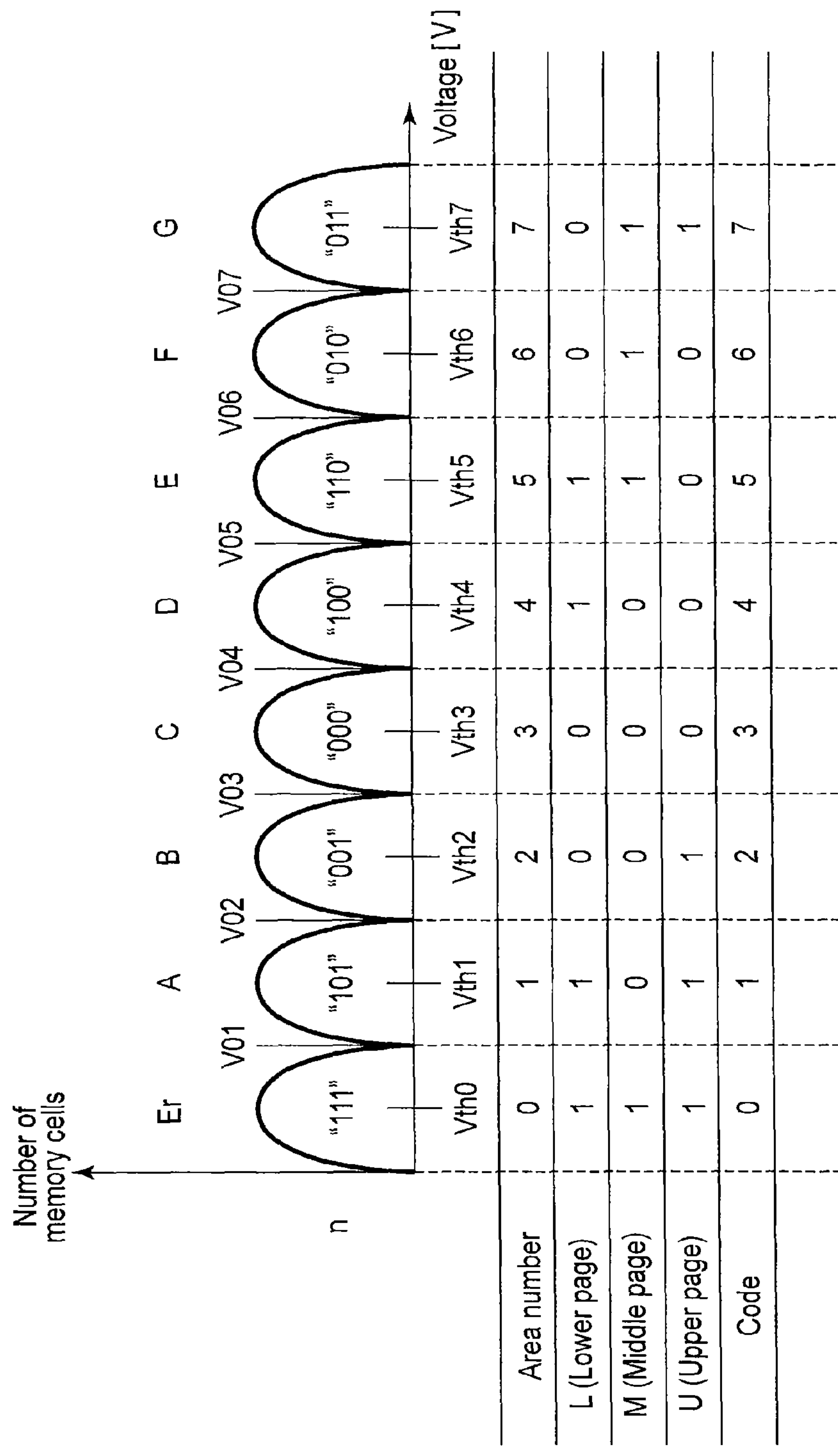
| Area number | 0 | 1 | 2 | 3 | 4 | 5 | 6 | 7 |
|---|---|---|---|---|---|---|---|---|
| L (Lower page) | 1 | 1 | 0 | 0 | 1 | 1 | 0 | 0 |
| M (Middle page) | 1 | 0 | 0 | 0 | 0 | 1 | 1 | 1 |
| U (Upper page) | 1 | 1 | 1 | 0 | 0 | 0 | 0 | 1 |
| Code | 0 | 1 | 2 | 3 | 4 | 5 | 6 | 7 |
F I G. 1 7

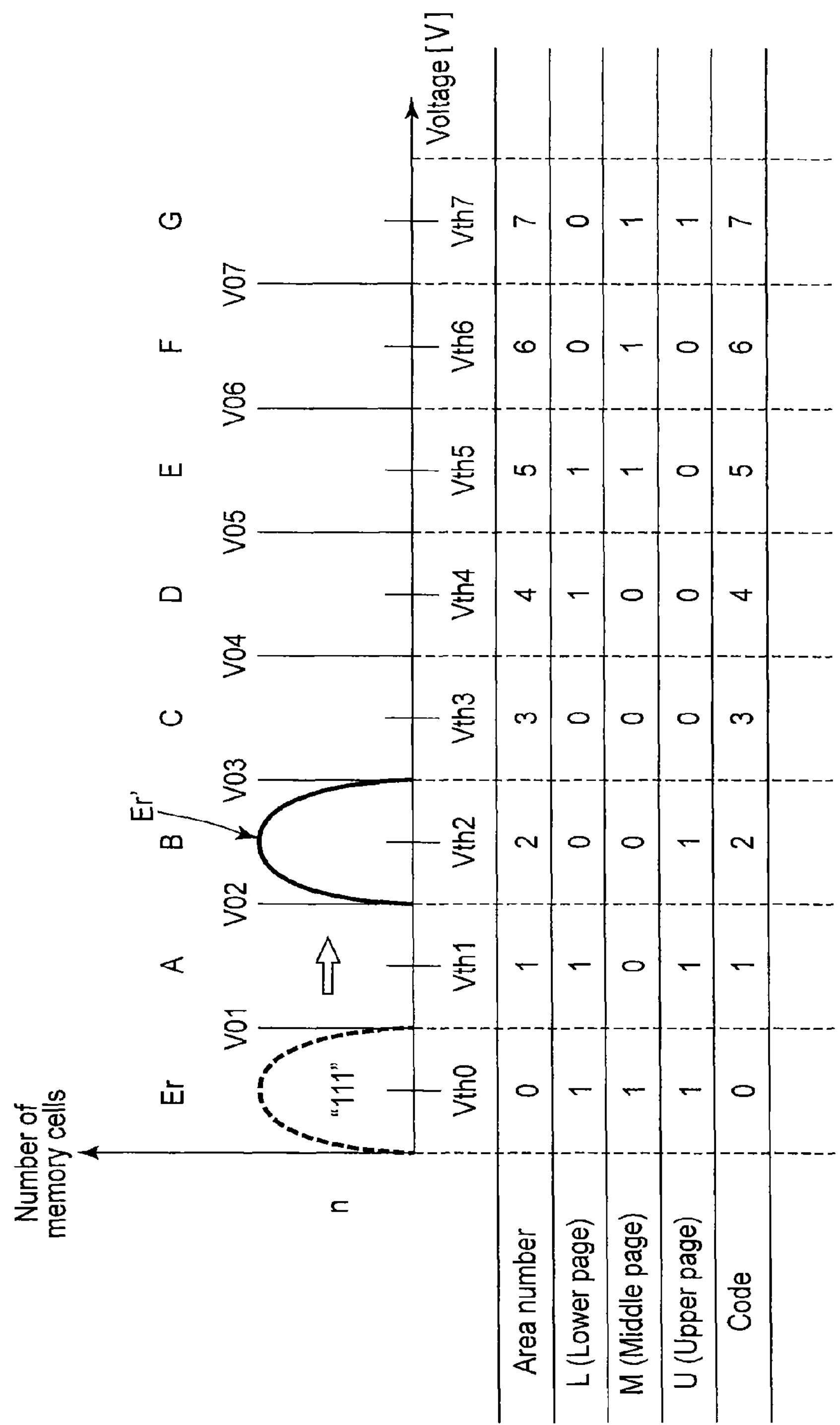
| | Er | A | B | C | D | E | F | G |
|---|---|---|---|---|---|---|---|---|
| | Vth0 | Vth1 | Vth2 | Vth3 | Vth4 | Vth5 | Vth6 | Vth7 |
| Area number | 0 | 1 | 2 | 3 | 4 | 5 | 6 | 7 |
| L (Lower page) | 1 | 1 | 0 | 0 | 1 | 1 | 0 | 0 |
| M (Middle page) | 1 | 0 | 0 | 0 | 0 | 1 | 1 | 1 |
| U (Upper page) | 1 | 1 | 1 | 0 | 0 | 0 | 0 | 1 |
| Code | 0 | 1 | 2 | 3 | 4 | 5 | 6 | 7 |
F I G. 1 8

MEMORY SYSTEM

CROSS-REFERENCE TO RELATED APPLICATIONS

This application claims the benefit of U.S. Provisional Application No. 61/695,386, filed Aug. 31, 2012, the entire contents of which are incorporated herein by reference.

FIELD

Embodiments described herein relate generally to a memory system.

BACKGROUND

To realize a semiconductor memory device capable of high-density recording and the like, digital data error-correcting codes are being developed now. Error-correcting codes can be roughly classified into an algebraic error-correcting method and an error-correcting method using iterative calculations based on probability. It has been reported that low-density parity check (LDPC) codes belonging to the latter have a superior performance that approaches the Shannon limit.

BRIEF DESCRIPTION OF THE DRAWINGS

FIG. 1 schematically shows the basic configuration of a memory system according to a first embodiment;

FIG. 2 is a block diagram schematically showing the basic configuration of a NAND flash memory according to the first embodiment;

FIG. 3 is a block diagram schematically showing the basic configuration of a memory cell array according to the first embodiment;

FIG. 4 shows an example of the circuit of one of a plurality of memory blocks shown in FIG. 3;

FIG. 5 is a schematic view of data areas related to a word line WL;

FIG. 6 is a graph with a horizontal axis representing a threshold distribution and a vertical axis representing the number of memory cell transistors MT;

FIG. 8 is a diagram to explain check matrix H1 according to the first embodiment;

FIG. 9 is a diagram to explain Tanner graph G1 according to the first embodiment;

FIGS. 10(A) and 10(B) are diagrams to explain row processing in the case of Tanner graph G2 of the first embodiment and FIGS. 10(C) and 10(D) are diagram to explain column processing;

FIG. 11 is a flowchart to explain ECC processing according to the first embodiment;

FIG. 12 is a flowchart to explain ECC processing according to the first embodiment;

FIG. 13 is a flowchart to explain ECC processing according to the first embodiment;

FIG. 15 schematically shows the basic configuration of a memory system according to a second embodiment;

FIG. 16 is a schematic view of data areas related to a word line WL;

FIG. 17 is a graph to explain encoding according to the second embodiment;

FIG. 18 is a graph to explain threshold shift according to the second embodiment;

FIG. 20 is a schematic view of a data area related to a word line WL.

DETAILED DESCRIPTION

Figure 7:
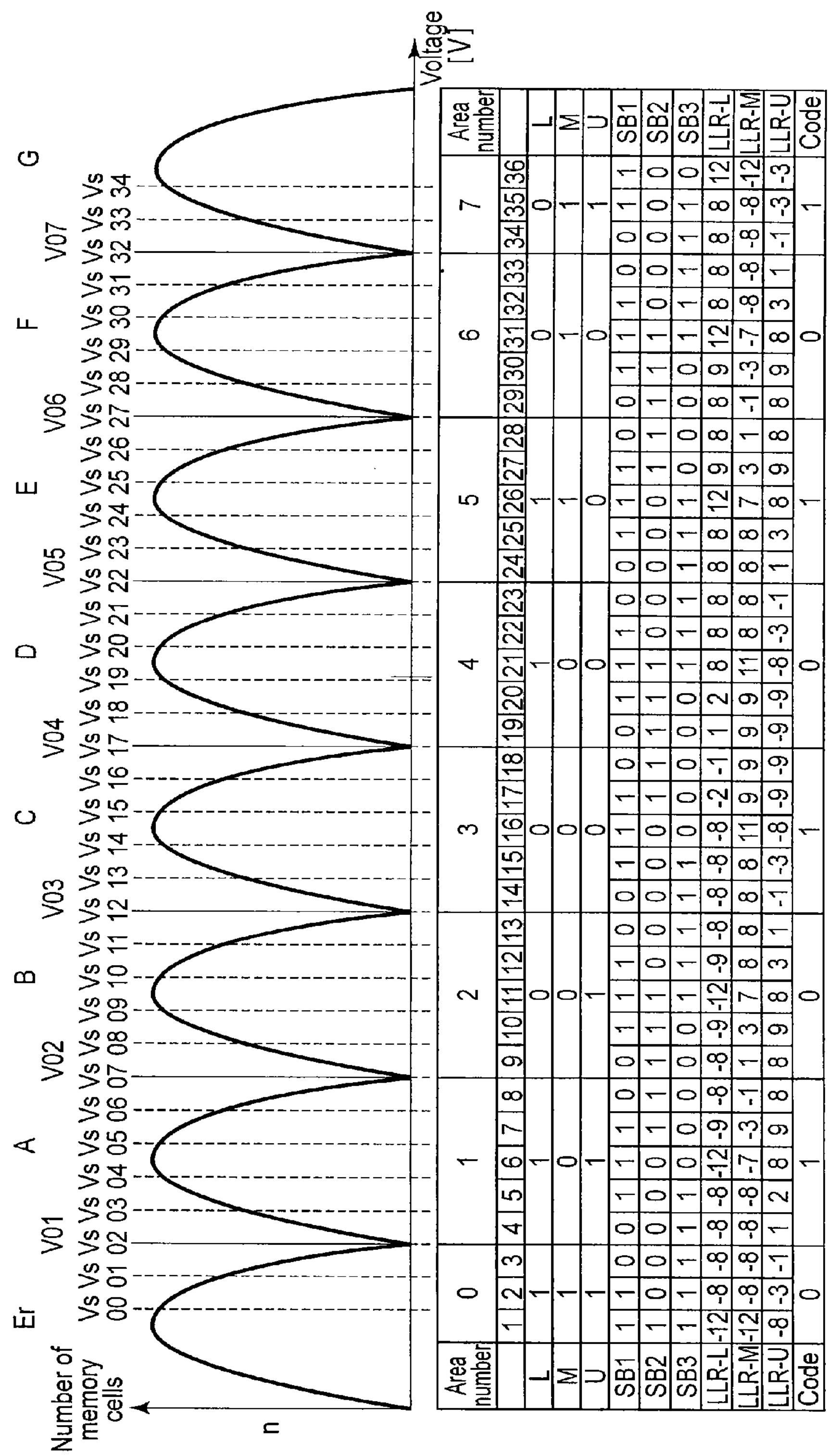
FIG. 7 is a graph to explain encoding according to the first embodiment.

In general, according to one embodiment, a memory module which includes a plurality of nonvolatile memory cells with a plurality of pages and line-and-space word lines to which more than one of the memory cells are connected; and a controller which receives write data from a host device, creates a first error correction code for each page based on the write data stored on a same page connected to a same word line, creates a second error correction code in units of one or more of the memory cells based on the write data stored in the memory cells, adds the first and second error correction codes to the write data, stores the first-and-second-error-correction-codes-added data on the pages in the memory module, makes a first error correction of the first-and-second-error-correction-codes-added data by using the first error correction code, and identifies the memory cell that has made an error by using the second error correction code for the first-and-second-error-correction-codes-added data when the first error correction has failed.

Hereinafter, embodiments will be explained in detail with reference to the accompanying drawings. In the explanation below, structural elements that have almost the same functions and configurations will be indicated by the same reference numerals or codes and repeated explanations will be given only when needed. Each embodiment described below will illustrate an apparatus or method for materializing technical ideas of the embodiment. In the technical ideas of the embodiment, the material, shape, structure, layout, and others of component parts are not limited to those described below. The technical ideas of the embodiment can be modified variously within the scope of claims.

First Embodiment

Configuration of Memory System

The basic configuration of a memory system 100 according to a first embodiment will be roughly explained with reference to FIG. 1.

As shown in FIG. 1, the memory system 100 comprises a memory controller 100*a* and a flash memory 109.

The memory controller 100*a* includes a central processing unit (CPU) 103, a volatile instruction table memory 105, and a firmware table memory 106. When there is no need to distinguish between the instruction table 105 and firmware table memory 106, they will simply be referred to as a volatile memory. The CPU 103 controls the flash memory 109 on the basis of data (instructions or control programs) stored in the volatile memory.

The memory controller 100*a* includes a host interface (I/F) 101, a memory buffer 102, the CPU 103, a bus 104, the instruction table memory 105, the firmware table memory 106, an error-correcting code (ECC) circuit 107, and a flash interface (I/F) 108.

The host interface 101 is connected to a host device (external device) 200, such as a personal computer, and further connected to the bus 104. Data is exchanged between the host device 200 and memory system 100 via the host interface 101.

The memory buffer 102 is connected to the host interface 101 and further connected to the bus 104. The memory buffer 102 receives, via the host interface 101, data transmitted from the host device 200 to the memory system 100 and holds the data temporarily. In addition, the memory buffer 102 temporarily holds data transmitted from the memory system 100 to the host device 200 via the host interface 101.

The CPU 103 supervises the overall operation of the memory system 100. The CPU 103 performs a specific process on the flash memory 109 according to a command received from the host device 200 under the control of, for example, a control program.

The instruction table memory 105, which is, for example, a volatile memory, stores an instruction code for accessing the flash memory 109 and the like.

The firmware table memory 106 is connected to the bus 104. The firmware table memory 106, which is, for example, a volatile memory, holds a control program and the like executed by the CPU 103.

The ECC circuit 107 is connected to the memory buffer 102, instruction table memory 105, and firmware table memory 106. The ECC circuit 107 receives write data from the host device 200 via the memory buffer 102, adds an error-correcting code to the write data, and supplies the error-correcting-code-added write data to, for example, the memory buffer 102 or flash interface 108. In addition, the ECC circuit 107 receives data supplied from the flash memory 109 via the flash interface 108, makes an error correction of the data using error-correcting codes, and supplies the error-corrected data to, for example, the memory buffer 102, instruction table memory 105, firmware table memory 106, and the like.

Furthermore, the ECC circuit 107 includes a low density parity check (LDPC) module 107*a* and a Bose-Chaudhuri-Hocquenghem (BCH) module 107*b*.

The LDPC module 107*a* of the first embodiment uses a low density parity check (LDPC) code, an error-correcting code to be decoded by iterative calculations based on probability.

The LDPC module 107*a* includes an LDPC encoder (not shown) that creates and gives an error-correcting code in storing data and an LDPC decoder (not shown) that decodes read encoded data in reading data. The LDPC decoder includes a bit node storage module (LMEM) (not shown), a computing module (not shown), a check node storage module (TMEM) (not shown), an LDPC buffer (not shown) serving as a decoded data storage memory, and an LLR conversion module (not shown). The LMEM and others are made of semiconductor memory, such as SRAMs or registers.

A concrete operation of the LDPC module 107*a* is such that, in the process of storing data, data transmitted from the host device 200 is stored in the LDPC buffer temporarily and then an LDPC parity is created by the LDTC encoder.

The LDPC module 107*a* performs a decoding process using a sumproduct algorithm for repeating the process of propagating reliability level $\alpha$ from a check node set so as to correspond to a Tanner graph for an LDPC code check matrix to a plurality of bit nodes connected to the check node and the process of propagating reliability level $\beta$ from a bit node to a plurality of check nodes connected to the bit node. A concrete operation using LDPC codes will be explained later.

The BCH module 107*b* includes a BCH encoder (not shown) based on an algebraic error-correcting method and a BCH decoder (not shown) that decodes encoded data read in reading data.

In a concrete operation of the LDPC module 107*a*, a BCH parity is created cell by cell by the BCH encoder for data transmitted from the host device 200 in the process of storing data. A concrete parity creating method will be explained later.

The ECC circuit 107 adds a page ECC parity and a cell ECC parity to page-based data by use of a selector (not shown) and outputs the resulting data as encoded data. In addition, the ECC circuit 107 stores encoded data in the flash memory 109 via the flash interface 108.

The flash interface 108 is connected to the ECC circuit 107, bus 104, and instruction table memory 105.

The flash memory 109 includes a page buffer and a memory module which are not shown here. The page buffer reads data from the memory module on the basis of a command supplied from the memory controller 100*a* and holds the data temporarily. Then, the page buffer supplies the data to the memory controller 100*a* via, for example, the flash interface 108. The memory module is a memory cell array which includes a plurality of bit lines, a plurality of word lines, and a common source line and which has electrically rewritable memory cells arranged in a matrix. The memory cells are composed of, for example, EEPROM cells.

The memory system 100 includes an LLR storage module that stores a logarithmic likelihood ratio (LLR) table and components (not shown), including a hard decision module, a part of the LDPC decoder.

While in the first embodiment, a NAND flash memory is used as a nonvolatile flash memory 109, the flash memory 109 is not necessarily limited to this.

Overall Configuration of NAND Flash Memory

A configuration of the NAND flash memory 109 according to the first embodiment will be roughly explained with reference to FIG. 2. FIG. 2 is a block diagram schematically showing a basic configuration of the NAND flash memory 109 according to the first embodiment.

As shown in FIG. 2, the NAND flash memory 109 comprises a memory cell array 11, a bit line control circuit 12, a column decoder 13, a data input/output buffer 14, a data input/output terminal 15, a row decoder 16, a control circuit 17, a control signal input terminal 18, and a source line control circuit 19.

The memory cell array 11 includes a plurality of bit lines BL, a plurality of word lines WL, and source line SRC. The memory cell array 11 is composed of a plurality of blocks BLK. In each block BLK, electrically rewritable memory cell transistors (also simply referred to as memory cells) MC are arranged in a matrix. Each of the memory cells MC includes, for example, a stacked gate that includes a control gate electrode and a charge storage layer (for example, a floating gate electrode). The memory cell MC stores multilevel data by a change in the threshold level of a transistor determined by the amount of charges injected into the floating gate electrode. The memory cell MC may have a metal-oxide-nitride-oxide-silicon (MONOS) structure that traps electrons in a nitride film.

The bit line control circuit 12 includes a sense amplifier (not shown) that senses and amplifies a voltage of a bit line BL in the memory cell array 11 and a data storage circuit (not shown) for latching data for writing. The bit line control circuit 12 reads data in a memory cell MC in the memory cell array 11 via a bit line BL, senses the state of the memory cell MC via a bit line BL, or writing data into the memory cell MC by applying a write control voltage to the memory cell MC via a bit line BL.

The column decoder 13 selects a data storage circuit in the bit line control circuit 12 and outputs data in a memory cell MC read into the data storage circuit at the data output terminal 15 to the outside (controller 100*a*) via the data input/output buffer 14.

The data input/output buffer 14 receives data from the data input/output terminal 15 and stores the data in the data storage circuit selected by the column decoder 13. In addition, the data input/output buffer 14 outputs data to the outside via the data input/output terminal 15.

The data input/output terminal 15 receives not only write data but also various commands, including write, read, erase, and status read commands, and addresses.

The row decoder 16 selects any one of the blocks BLK in a read operation, a write operation, or an erase operation and makes the remaining blocks BLK unselected. That is, the row decoder 16 applies necessary voltages to the word lines WL and select gate lines VSGS, VSGD in the memory cell array 11 in a read operation, a write operation, or an erase operation.

The source line control circuit 19 controls the voltage of source line SRC.

The control circuit 17 controls the memory cell array 11, bit line control circuit 12, column decoder 13, data input/output buffer 14, row decoder 16, and source line control circuit 19. Suppose the control circuit 17 includes a step-up circuit (not shown) that steps up a power supply voltage. The control circuit 17 causes the step-up circuit to step up a power supply voltage as needed and supplies the stepped-up voltages to the bit line control circuit 12, column decoder 13, data input/output buffer 14, row decoder 16, and source line control circuit 19.

The control circuit 17 performs a control operation according to control signals (including command latch enable signal CLE, address latch enable signal ALE, and ready/busy signal RY/BY) input from the outside via the control signal input terminal 18 and commands input from the data input/output terminal 15 via the data input/output buffer 14. That is, the control circuit 17 generates desired voltages according to the control signals and commands in programming, verifying, reading, or erasing data and supplies the generated voltages to the various part of the memory cell array 11.

Overview of Memory Cell Array

FIG. 3 is a block diagram schematically showing a basic configuration of the memory cell array 11 according to the first embodiment. FIG. 4 shows an example of the circuit of one of the memory blocks shown in FIG. 3.

The memory cell array 11 is composed of a plurality of memory blocks BLOCK1 to BLOCKm (m being an integer not less than one). Memory blocks BLOCK1 to BLOCKm are arranged in a bit line BL direction (or a column direction).

As shown in FIG. 4, a memory block includes a plurality of NAND cells (also referred to as cell units or NAND strings) arranged in a direction of word line WL (or a row direction).

A NAND cell includes a plurality of memory cell transistors (also simply referred to as memory cells) MT connected in series, select gate transistor ST1 connected to the drain of a memory cell transistor MT at one end of the series connection, and select gate transistor ST2 connected to the source of a memory cell transistor at the other end.

Each of the memory cell transistors MT includes a charge storage layer formed above a semiconductor substrate via a gate insulating film, the gate insulating film formed on the charge storage layer, and a control gate electrode formed on the gate insulating film. The number of memory cell transistors MT is not limited to eight and may be 16, 32, 64, 128, 256, or the like. The number of memory cell transistors is not restrictive. Of the memory cell transistors MT, adjacent ones share a source and a drain. The memory cell transistors MT are arranged between select gate transistors ST1, ST2 in such a manner that their current paths are connected in series. The drain region at one end of the series connection of memory cell transistors MT is connected to the source region of select gate transistor ST1. The source region at the other end of the series connection is connected to the drain region of select gate transistor ST2.

Bit lines BL0 to BLq−1 (q being an integer not less than one) are connected to the drain of select gate transistor ST1. Source line SL is connected to the source of select gate transistor ST2. When there is no need to distinguish between bit lines BL0 to BLq−1, they will be collectively called bit lines BL. Both select transistors ST1 and ST2 are not necessarily needed. Only one of them may be provided on condition that a NAND cell can be selected.

Word lines WL0 to WLn−1 (n being an integer not less than one) extend in the WL direction. Each word line is connected to memory cells arranged side by side in the WL direction in a common connection manner. For ease of explanation, when there is no need to distinguish between word lines WL0 to WL7, they will simply be called word lines WL.

Select gate line SGD is connected to the gate electrodes of select gate transistors ST1 for memory cells in a common connection manner. Select gate line SGS is connected to the gate electrodes of select gate transistors ST2 for memory cells in a common connection manner.

Data is written en bloc into a plurality of memory cell transistors MT connected to the same word line WL. This unit is called a page. In addition, data is erased en bloc from a plurality of NAND cells in the same row. This unit is called a memory block.

Method of Storing Data

Next, a method of storing data in the memory cell array 11 will be explained with reference to FIG. 5. FIG. 5 is a schematic view of data areas for a word line WL. As shown in FIG. 5, each data area includes a normal data area and an ECC data area.

As for the memory cell transistors MT according to the first embodiment, three bits are stored in a memory cell transistor MT. Therefore, in a memory cell transistor MT, three bits are assigned to different pages (lower page, middle page, upper page). That is, a word line WL has three pages: lower (L), middle (M), and upper (U).

The normal data area and ECC data area are areas for holding data transferred from a host device (for example, a personal computer or a digital camera) 200 that controls the NAND flash memory 109 to the NAND flash memory 109. The normal data area is an area for holding net data input by the user. The ECC data area is an area for holding ECC data (for example, parity) to make ECC correction of data stored in the normal data area.

The ECC data area includes a page parity area and a cell parity area.

The page parity area stores page parity data used in page ECC described later. The page parity data is a parity created for each page. The page parity data is management information that manages, in an integrated manner, page data belonging to the same page of the same word line WL.

The cell parity area stores parity data used in cell ECC described later. The cell parity data is parity data created for each cell that includes three pages, L, M, and U. The cell parity data is management information that manages, in an integrated manner, three data items on pages L, M, and U belonging to the same cell.

Threshold Distribution in Memory Cell Transistor MT

Next, a threshold distribution of the memory cell transistor MT will be explained with reference to FIG. 6. FIG. 6 is a graph that represents a threshold distribution on the horizontal axis and the number of memory cell transistors MT on the vertical axis. As shown in FIG. 6, each memory cell transistor MT can hold, for example, 8-level data (or 3-bit data). Specifically, the memory cell transistor MT can hold eight items of data, level Er, level A, level B, level C, level D, level E, level F, and level G in ascending order of threshold voltage Vth.

Levels Er, A, B, C, D, E, F, and G are caused to correspond to 111, 101, 001, 000, 100, 110, 010, and 011 data in a binary representation, respectively. The individual bits in the 3-bit data are called an upper page (or an upper bit), a middle page (or a middle bit), and a lower page (or a lower bit), respectively, as shown in FIG. 6. The relationship between level Er to level G and 111 data to 011 data is not limited to the case of FIG. 6 and may be selected arbitrarily.

Threshold voltage Vth0 of 111 data in a memory cell transistor MT satisfies the expression Vth0<V01. Threshold voltage Vth1 of 101 data satisfies the expression V01<Vth1<V02. Threshold voltage Vth2 of 001 data satisfies the expression V02<Vth2<V03. Threshold voltage Vth3 of 000 data satisfies the expression V03<Vth3<V04. Threshold voltage Vth4 of 100 data satisfies the expression V04<Vth4<V05. Threshold voltage Vth5 of 110 data satisfies the expression V05<Vth5<V06. Threshold voltage Vth6 of 010 data satisfies the expression V06<Vth6<V07. Then, threshold voltage Vth7 of 011 data satisfies the expression V07<Vth7. As described above, the memory cell transistor MT can hold three bits of data according to a threshold level.

As described above, data is written en bloc into or read en bloc from the memory cell transistors MT connected to the same word line WL. At this time, data is written or read in units of the lower bits, middle bits, or upper bits. Therefore, when a memory cell transistor MT holds 3-bits data, three pages are allocated to each word line WL. A page into or from which the lower bits are written or read en block is an lower page. A page into or from which the middle bits are written or read en block is a middle page. A page into or from which the upper bits are written or read en block is an upper page.

As seen from FIG. 6, when data has been written into only the lower page, the memory cell transistor MT can take only two states, a state where the memory cell transistor MT has a threshold value corresponding to level Er and a state where the memory cell transistor MT has a threshold value corresponding to level A or higher. In contrast, when data has been written up to the upper page, the memory cell transistor MT can take eight states, level Er to level G.

Encoding

Next, encoding according to the first embodiment will be explained with reference to FIG. 7. FIG. 7 is a graph to explain encoding according to the first embodiment.

As shown in FIG. 7, area numbers are allocated to areas corresponding to level Er to level G of a memory cell transistor MT, respectively. Specifically, area number 0 is allocated to level Er; area number 1, to level A; area number 2, to level B; area number 3, to level C; area number 4, to level D; area number 5, to level E; area number 6, to level F; and area number 7, to level G.

As described above, the lower, middle, and upper pages corresponding to level Er are at 1, 1, and 1, respectively; those corresponding to level A, at 1, 0, and 1, respectively; those corresponding to level B, at 0, 0, and 1, respectively; those corresponding to level C, at 0, 0, and 0, respectively; those corresponding to level D, at 1, 0, and 0, respectively; those corresponding to level E, at 1, 1, and 0, respectively; those corresponding to level F, at 0, 1, and 0, respectively; and those corresponding to level G, at 0, 1, and 1, respectively.

Here, code 0 is allocated to levels (specifically, Er, B, D, and F) whose area number is 0 or an even number (or odd in ascending order of threshold value). Code 1 is allocated to levels (specifically, A, C, E, and G) whose area number is odd (or even in ascending order of threshold value).

The ECC circuit 107 (BCH module 107*b*) includes a table where an area is specified for each threshold distribution of data in a memory cell as described above. Having received write data from the host device 200, the BCH module 107*b* (BCH encoder) determines an area of the data and calculates a parity on the basis of the aforementioned code. The ECC circuit 107 (BCH module 107*b*) transfers the data stored in the memory buffer 102 together with the parity calculated at the BCH encoder to the flash interface 108, thereby writing the data into the flash memory 109.

As described above, allocating a 1-bit code to 3-bit data enables the parity size of cell ECC (BCH) to be compressed.

LDPC Encoding

Before explanation of an ECC operation according to the first embodiment, LDPC codes used in an ECC operation of the first embodiment will be explained with reference to FIG. 8.

An LDPC code is a linear code defined by a very sparse check matrix, that is, a check matrix with few nonzero elements. An LDPC code can be represented by a Tanner graph. An error-correcting process corresponds to the process of updating data by making an exchange of the result of local deduction between a bit node corresponding to each bit in code words connected on a Tanner graph and a check node corresponding to each parity check equation.

FIG. 8 shows check matrix H1 with a row weight of wr=3 and a column weight of we=2 in a (6, 2) LDPC code. The (6, 2) LDPC code is a 2-bit LDPC code with a code length of 6 bits and an information length of 2 bits.

As shown in FIG. 9, when check matrix H1 is represented by Tanner graph G1, bit nodes correspond to columns in check matrix H1 and check nodes correspond to rows in check matrix H1. Nodes at 1 are connected with edges in the elements of check matrix H1, constructing Tanner graph G1. For example, “1” enclosed with a circle corresponds to an edge shown by a bold line in Tanner graph G1. A row weight of wr=3 in check matrix H1 corresponds to the number of bit nodes connected to a check node, that is, the number of edges being 3. A column weight of we=2 corresponds to the number of check nodes connected to a bit node, that is, the number of edges being 2.

LDPC encoded data is decoded by iteratively updating reliability (probability) information allocated to the edges of the Tanner graph at nodes. Reliability information includes two types: one is probability information (hereinafter, also referred to as “external value” or “external information” and represented by symbol α) from a check node to a bit node and the other is probability information (hereinafter, also referred to as "a priori probability," "a posteriori probability," simply "probability," or "logarithmic likelihood ratio (LLR) and represented by symbol β) from a bit node to a check node. The reliability update process includes a row process and a column process. A unit in which each of a row process and a column process is performed once is called a one iteration (round) process. A decoding process is performed by an iterative process of repeating an iteration process.

As described above, the external value α is probability information from a check node to a bit node in an LDPC decoding process. The probability β is probability information from a bit node to a check node. Both the external value α and the probability β are terms known to those skilled in the art.

In the semiconductor memory device, threshold determination information is read from a memory cell that has stored encoded data. The threshold determination information is composed of a hard bit (HB) that indicates whether the stored data is either 0 or 1 and a plurality of soft bits that indicate the reliability of a hard bit. The threshold determination information is converted into LLR with a previously created LLR table and makes an initial LLR in an iteration process.

Hereinafter, a row process and a column process will be explained using a part of Tanner graph G2 shown in FIG. 10(A) to FIG. 10(D). First, a bit node process (or a column process) will be explained with reference to FIG. 10(A) and FIG. 10(B). Let LLR, an initial reliability level of an input code word bit corresponding to a bit node, such as bit node 3, be λ(3). Let the probability of a check node to bit node 3 be α(j, 3). Here, j indicates a check node number connected to bit node 3.

Then, bit node 3 calculates the following equation 1 for a check node of an edge corresponding to α(1, 3), that is, check node 1:

$$\beta(3,1)=\lambda(3)+\alpha(2,3) \quad (1)$$

Similarly, bit node 3 calculates the following equation 2 for a check node with node number j:

$$\beta(3,j)=\lambda(3)+\Sigma\alpha(k,3) \quad (2)$$

Here, Σ means the total sum of the check nodes connected to bit node 3 excluding one with k=j.

The above calculations are done for all of the bit nodes, calculating β(i, j) expressed by the following equation 3. Here, if the code length is N and the node number is i, it follows that i=1 to N. In addition, Σ means the total sum of the check nodes connected to bit node i excluding one with k=j.

$$\beta(i,j)=\lambda(i)+\Sigma\alpha(k,i) \quad (3)$$

Next, a check node process (a row process) will be explained with reference to FIG. 10(C) and FIG. 10(D). If external information, a message for a check node, such as check node 1, is β(k, 1), the check node calculates α(1, 1) expressed by the following equation 4 for a bit node of an edge corresponding to β(1, 1), or bit node 1:

$$\alpha(1,1)=\text{sign}(\pi\beta(m,1))\times\min(|\beta(m,1)|) \quad (4)$$

where k is a bit node number connected to check node 1. Then, m is selected from the range of 2 to 3. Here, sign (πβ(m, 1)) means a sign (+1 or −1) as a result of multiplying β(m, 1) from m=2 to m=3. In addition, |β(m, 1)| is an absolute value of β(m, 1) and min is a function for selecting the minimum value from more than one |β(m, 1)|.

Similarly, α(1, 1) is also calculated using the following equation 5:

$$\alpha(1,i)=\text{sign}(\pi\beta(m,1))\times\min(|\beta(m,1)|) \quad (5)$$

where i is a bit node number connected to check node 1. In a Tanner graph in FIG. 10(B), i is 1, 2, or 3. In addition, m is any one of the bit nodes connected to check node 1 excluding one with m=i.

The above calculations are done for all of the check nodes and α(j, i) is calculated using the following equation 6:

$$\alpha(j,i)=\text{sign}(\pi\beta(m,j))\times\min(|\beta(m,j)|) \quad (6)$$

where m is any one of the bit nodes connected to check node j excluding one with m=i.

In iterative decoding, each time one iteration process (or one round) where the aforementioned bit node process and check node process each have been performed once is performed, a posteriori probability Pb(i) is found using the following equation 7:

$$Pb(i)=\lambda(i)+\Sigma\alpha(k,i) \quad (7)$$

where i=1 to N and N is a code length. In addition, Σ is the sum of all the check nodes connected to bit node i.

A bit decision is made on the basis of the a posteriori probability value (temporarily estimated word) Pb. That is, a hard decision is made as to whether the bit is either 1 or 0. A parity check of an LDPC code is made using the hard decision result. When it has been confirmed that there is no error, the iterative process is terminated.

In a reliability update algorithm in bit nodes and check nodes using a sumproduct algorithm, a mini-sumproduct algorithm, or the like as a message transmission algorithm, a decoding process can be performed in parallel processing.

ECC Process

Next, an ECC process according to the first embodiment will be explained with reference to FIG. 11. FIG. 11 is a flowchart to explain an ECC process of the first embodiment. Hereinafter, for ease of explanation, suppose a page size, a unit in a storing/reading process, and an LDPC frame (hereinafter, also referred to as a "frame") size, a unit in an encoding/decoding process, are the same in bits.

In the process of reading data, a specific voltage is applied to the individual memory cells in the flash memory 109 sequentially according to a command from the host device 200, thereby reading threshold determination information. The threshold determination information is composed of a hard bit (HB) that indicates whether the stored bit data is either 0 or 1 and a plurality of soft bits (SB1 to SB3) that indicate the reliability of a hard bit. Data decoded by the LDPC decoder on the basis of the threshold determination information is transmitted to the host device 200.

[Step S1001]

First, page L, page M, and page U belonging to a word line WL are read into the ECC circuit 107. The LDPC module 107*a* performs an ECC operation on each page (also referred to as a page ECC operation) using a page parity stored on each page.

Here, a more concrete operation in step S1001 will be explained with reference to FIG. 12.

[Step S1100]

The threshold value of each of page L, page M, and page U belonging to a word line WL read from the flash memory 109 is determined according to a command from the host device 200. Here, a decision on a hard bit (HB) (also referred to as hard-decision) and a decision on soft bits (SBs) used in a subsequent process may be made in advance. While in the first embodiment, only three types of soft bits are shown, the number of types is not limited to this and may be changed variously, depending on the memory system.

As shown in FIG. 7, a decision on a hard bit (HB) on each page is made by using seven types of voltages, V01, V02, V03, V04, V05, V06, and V07.

In addition, as shown in FIG. 7, to read soft bits (SB), it is necessary to apply 35 types of voltages, VS00 to VS34, to the corresponding memory cells.

[Step S1101] Receive of Threshold Determination Information

The threshold determination information on frame-based data read from the flash memory 109 according to the command from the host device 200 is received by the memory controller 100*a*. Threshold determination information on each bit is composed of a hard bit (HB).

[Step S1102] Threshold Determination Information Storing Process

Pieces of 4-bit threshold determination information (HB, SB1, SB2, SB3) are stored in frames in the LDPC buffer serving as a first memory module. In other words, the LDPC buffer stores threshold determination information on data read from the NAND flash memory module.

More specifically, the LDPC buffer comprises a 30-bit HB module, a 30-bit SB1 module, a 30-bit SB2 module, a 30-bit SB3 module, and a 30-bit LB module. Therefore, the LDPC buffer has a storage capacity of 150 bits. A bit address at which data in the same frame is stored is made common to each module. Since the frame size is 30 bits, threshold determination information stored in the buffer 24 is composed of 120 (4×30) bits.

[Step S1103] LLR Conversion Process

Frame-based threshold determination information stored in the LDPC buffer is converted by the LLR conversion module into logarithmic likelihood ratio (LLR) data that indicates the reliability of HB. The LLR conversion module performs a conversion process on the basis of an LLR table previously created based on the threshold voltage distribution of memory cells.

HB basically shows only whether stored data is either 0 or 1. However, each HB differs in read voltage and therefore the reliability differs with the read voltage. For example, HB(111) with the lowest read voltage stored in the Er state and HB(011) with the highest read voltage stored in the G state have higher reliability than other HBs.

An HB-LLR table for LLR conversion based on only HBs is prepared in advance separately from an LLR table for LLR conversion based on SBs. LLR conversion based on only HBs is considerably course conversion as compared with LLR conversion using SBs.

When LLR conversion is performed based on SB1 to SB3, a table shown in FIG. 7 is used. Frame-based threshold determination information (SB1 to SB3) stored in the LDPC buffer is converted by the LLR conversion module into logarithmic likelihood ratio (LLR-L, LLR-M, LLR-U) data that indicates the reliability of SB1 to SB3.

[Step S1104] Store LLR Data

Frame-based 150-bit LLR data converted by the LLR conversion module is transferred to the LDPC buffer, which stores the data. That is, threshold determination information is erased from the LDPC buffer. LLR data is stored in the LDPC buffer instead.

As explained above, it is desirable that LLR data should be stored in an area (address) in which the corresponding pieces of unconverted threshold determination information were stored. That is, it is desirable that items of LLR data should be stored in the same bit addresses as those of the corresponding pieces of unconverted threshold determination information. The reason for this is to realize the sharing of the LMEM and LDPC buffers without a complicated data format conversion.

To store threshold determination information/LLR data in the same address, it is necessary that the number of quantization bits Q and the number of threshold determination information bits have the same bit length (bit count). However, even if they differ from each other in such a manner that the number of quantization bits is 5 and the number of threshold determination information bits is 4 as in the first embodiment, an LB module (with the number of quantization bits—threshold determination information bit length) is set in the LDPC buffer in advance, enabling LLR data to be stored in the same address. Here, the number of quantization bits, which is signed integer data, is the number of bits when a logarithmic likelihood ratio LLR is expressed numerically. The larger the number of quantization bits, the higher the accuracy.

[Step S1105] Initialize the Number of Iterations

The number of iterations is initialized to zero.

[Step S1106] LDPC Decoding Subroutine Process

LDPC decoding subroutine processes in steps S1200 to S1203 shown in FIG. 13 are performed.

[Step S1200] Row Process

A row process is performed on all the rows at an arithmetic circuit in the LDPC decoder.

[Step S1201] Column Process

A column process is performed on all the columns at the arithmetic circuit in the LDPC decoder.

[Step S1202] Calculate Temporarily Estimated Word

After an iteration process has been completed for all the blocks, a temporarily estimated word is calculated block by block at a hard decision module in the LDPC decoder on the basis of the corresponding updated probability information (a posteriori probability) β.

[Step S1203] Perform Parity Check

A parity check is performed block by block on the basis of a temporarily estimated word.

This completes the LDPC decoding subroutine processes in steps S1200 to S1203.

[Step S1107] Parity Check OK?

If the result of the parity check is unacceptable, a process in step S1108 is performed.

[Step S1108] Check the Number of Iterations

Processes in step S1106 and forward based on updated probability information are performed repeatedly until a specific largest number of iterations has been reached.

[Step 1002]

For example, the CPU 103 determines whether the LDPC module 10*p*7*a* has performed a page ECC operation successfully on all of page L, page M, and page U. When decoding has failed (or the result of the parity check is unacceptable) even if an iteration process has been performed the maximum number of times, the BCH module 107*b* carries out step S1003.

Specifically, if the number of iteration processes, the value of Itr, is larger than the maximum number of iterations MItr, the LDPC module 107*a* completes the decoding process without performing the iteration process any further, and informs the BCH module 107*b* that the decoding process is impossible.

In the decoding process at the LDPC module 107*a*, first, the maximum number of iterations MItr is set and a parameter Itr indicting the number of iterations is set to 0. The maximum number of iterations need not be set each time. A preset value may be used as the maximum number of iterations. The limit of iteration processes may be controlled by time, not by the number of times.

[Step S1003]

In step S1002, if it has been determined that page ECC operation has failed, the BCH module 107*b* performs an ECC operation on each cell using a cell parity stored on each of page L, page M, and page U. In the cell ECC operation, a correction is not made. A hard error (HE) cell whose value fluctuates in a hard bit (HB) decision and whose threshold value fluctuates beyond a soft bit (SB) is determined.

A hard error (HE) is an error that shifts 50% or more of, for example, a threshold interval, crossing over an adjacent area. More specifically, the hard error (HE) means an error whose threshold fluctuations is so large that a value fluctuates in a hard bit (HB) decision. It does not include an error whose threshold fluctuation is so small that a value fluctuates in a soft bit (SB) decision, but does not fluctuate in a hard bit (HB) decision.

For example, using soft bit (SB) information derived in step S1001, the BCH of the first embodiment narrows down a hard error (HE) cell that is causing such a large threshold fluctuation that a value fluctuates in a hard bit (HB) decision. Particularly in a ECC operation using LDPC codes, a hard error (HE) cell that might be determined to be safe in a soft bit decision even if it has failed in a hard bit decision is narrowed down.

To narrow down a hard error (HE) cell, the BCH decoder calculates a BCH syndrome, checking whether there is an error. That is, in algebraic decoding of BCH codes, an error position polynomial equation is output as a result of decoding. On the basis of the syndrome, only whether there is any error, in other words, whether any error is present, is detected. Calculating the error position polynomial equation enables error bit positions in the BCH code to be determined and therefore an error correction to be made. If there is no error, a syndrome to be output is 0.

Then, the BCH module 107*b* determines whether an absolute value of an LLR found in a soft bit (SB) decision corresponding to a cell where an error has been detected in a BCH code is larger than a specific value. If the absolute value of the LLR is larger than the specific value, the BCH module 107*b* detects the cell as a hard error (HE) cell.

[Step S1004]

The BCH module 107*b* determines whether a cell ECC operation on cells belonging to one word line WL has succeeded. That is, the BCH module 107*b* determines whether the cell ECC operation has been completed within the maximum number of correction symbols. Error correction in a cell ECC operation is an error correction using BCH codes.

[Step S1005]

Information on a hard error (HE) cell is input to the page ECC circuit. In the page ECC circuit, the logarithmic likelihood ratio (LLR) of bits belonging to a hard error (HE) cell is set to 0 meaning a disappeared state and then a correction process is performed.

[Step S1006]

After the logarithmic likelihood ratio (LLR) of bits belonging to a hard error (HE) cell has been set to 0 meaning a disappeared state, a page ECC operation is performed again as in step S1001.

[Step S1007]

If the result of the parity check is acceptable, the decoded data is stored temporarily in the memory buffer 102 and transmitted to the host device 200 via the host interface 101.

Operational Advantages of the Memory System According to the First Embodiment With the first embodiment, the memory system performs an ECC (LDPC) operation using a parity (a page parity) created for each page. When there is such a hard error (HE) that cannot be corrected even by an ECC (LDPC) operation, the memory system of the first embodiment performs an ECC (BCH) operation using a parity (a page parity) created for each cell, thereby detecting a hard error (HE) cell. In addition, the memory system sets the LLR of the hard error (HE) cell to 0, thereby correcting the hard error (HE) cell by an ECC (LDPC) operation.

Conventional ECCs are designed on the assumption of a defective model where a program value (threshold value) overlaps with an adjacent threshold area. However, such a defect (hard error (HE)) whose threshold value exceeds 50% or more of a threshold interval or which shifts beyond an adjacent threshold area is not predicted. Therefore, if a hard error (HE) has occurred, a cell where the hard error (HE) has occurred may not be corrected.

Figure 14:
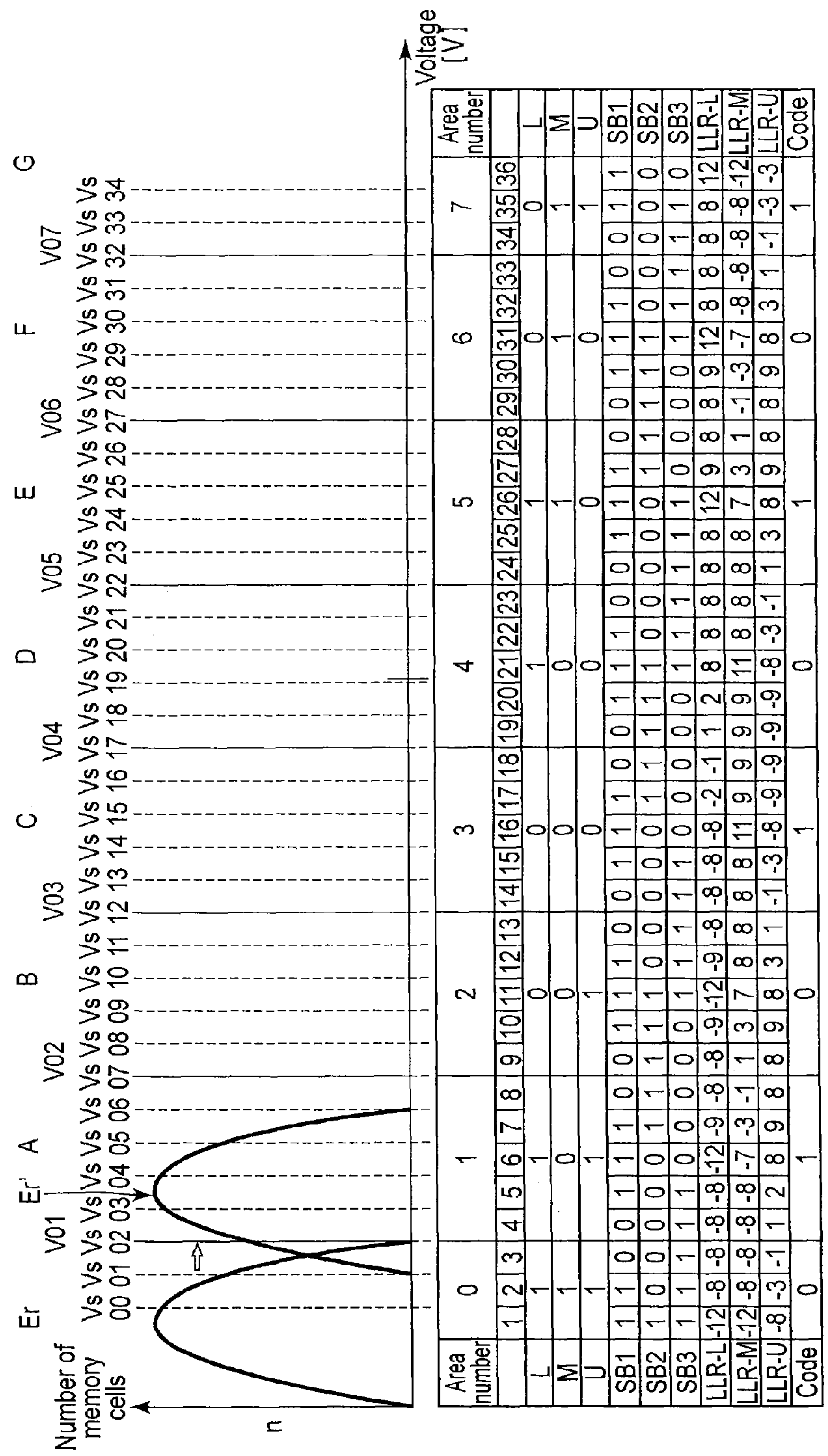
FIG. 14 is a graph to explain threshold shift according to the first embodiment.

For example, as shown in FIG. 14, the threshold value of a memory cell in which data at level Er has been stored might have fluctuated to level Er' that overlaps with an adjacent threshold area. In such a case, in an ECC operation using LDPC codes, the absolute value of a logarithmic likelihood ratio (LLR) of a hard error (HE) cell becomes larger, which might increase the correction failure probability.

In the memory system of the first embodiment, when data is stored, the ECC circuit 107 encodes data cell by cell by the BCH method and further encodes data page by page by the LDPC method. In other words, a BCH parity is added to each cell and an LDPC parity is added each page.

Then, in the memory system, when encoded data is read and decoded, an error detecting and correcting process is performed by LDPC on a page basis. If the correction has not been completed, an error position detecting process is performed by BCH on a cell basis.

This makes it possible to detect only a hard error (HD) cell. That is, to detect only hard errors (HE), an ECC (BCH) operation is performed using soft bits (SB). Basically, not many hard errors (HE) occur on a single word line WL (for example, about ten hard errors on a word line WL). Therefore, when BCH is designed based on cell ECC, the maximum number of correction symbols in BCH can be decreased. As a result, the cell parity size can be suppressed. Accordingly, cell ECC (BCH) and page ECC (LDPC) constitute a concatenated code, making it possible to avoid a decrease in the LDPC correcting capability due to a hard error (HE) cell. In other words, a decrease in the encoding ratio in page ECC and cell ECC can be avoided, enabling practical ECC to be implemented.

While in the aforementioned embodiment, a cell ECC operation has been performed after a page ECC operation and a page ECC operation has been performed again while the result of the cell ECC operation is being reflected, for example, a cell ECC operation may be performed first and then a page ECC operation be performed while the result of cell ECC is being reflected.

In addition, while in the first embodiment, an ECC operation has been performed using LDPC codes on a page basis, this is illustrative only. For instance, a page may be divided into four frames and an ECC operation be performed using LDPC codes on a frame basis.

Modification

Next, a modification of the memory system according to the first embodiment will be explained. In the memory system of the first embodiment, a BCH code has been created from a cell-based code in FIG. 7. However, a cell-based code may be used as an even-odd parity. The even-odd parity is a code which is created so as to correspond to a threshold area of a cell and which is for detecting an error. As described above, the even-odd parity makes it possible to sense that there is an error in any one of L bit, M bit, and U bit. Furthermore an even-odd parity is stored in the NAND flash memory 109 with data.

Second Embodiment

Next, a second embodiment will be explained. The basic configuration and basic operation of a memory system according to the second embodiment are the same as those of the memory system according to the first embodiment described above. Therefore, an explanation of the matters explained in the first embodiment and matters easily inferred from the first embodiment will be omitted.

ECC Circuit

The basic configuration of a memory system 100 according to the second embodiment will be roughly explained with reference to FIG. 15.

An ECC circuit 207 is connected to a memory buffer 102, an instruction table memory 105, and a firmware table memory 106. The ECC circuit 207 receives write data from a host device 200 via the memory buffer 102, adds an error correction code to the write data, and supplies the error-correction-code-added write data to, for example, the buffer memory 102 or a flash interface 108. In addition, the ECC circuit 207 receives data supplied from the flash memory 109 via the flash interface 108, makes an error correction of the data by using an error correction code, and supplies the error-corrected data to, for example, the memory buffer 102, instruction table memory 105, or firmware table memory 106.

Method of Storing Data

Next, a method of storing data in the memory cell array 11 will be explained with reference to FIG. 16. FIG. 16 is a schematic view of data areas for a word line WL. As shown in FIG. 16, each of the data areas includes a normal data area and an ECC data area.

As for memory cell transistors MT according to the second embodiment, three bits are stored in a memory cell transistor MT. Therefore, in a memory cell transistor MT, three bits are assigned to different pages (Lower page, Middle page, Upper page). That is, a word line WL has three pages, L (Lower) page, M (Middle) page, and U (Upper) page.

The normal data area and ECC data area are areas for holding data transferred from the host device 200 that controls the NAND flash memory 109 to the NAND flash memory 109. The normal data area is an area for holding net data input by the user. The ECC data area is an area for holding ECC data (for example, parity) to make ECC correction of data stored in the normal data area.

The ECC data area includes a cell parity area.

The cell parity area stores parity data used in cell ECC described later. The cell parity data is parity data created for each cell that includes data on three pages, L, M, and U. The cell parity data is management information that manages, in an integrated manner, three data items on pages L, M, and U belonging to the same cell.

Encoding

Next, encoding according to the second embodiment will be explained with reference to FIG. 17. FIG. 17 shows an example of encoding a 3-bit flash memory cell by Reed-Solomon RS.

As shown in FIG. 17, area numbers are allocated to areas corresponding to level Er to level G of a memory cell transistor MT, respectively. Specifically, area number 0 is allocated to level Er. Area number 1 is allocated to level A. Area number 2 is allocated to level B. Area number 3 is allocated to level C. Area number 4 is allocated to level D. Area number 5 is allocated to level E. Area number 6 is allocated to level F. Area number 7 is allocated to level G.

The values of a lower page, a middle page, and an upper page corresponding to each level are the same as in FIG. 7. A code allocated to each level is the same as the corresponding area number.

The ECC circuit 207 includes, for example, a table where an area is specified for each threshold distribution of data in a memory cell as described above. Having received write data from the host device 200, the ECC circuit 207 determines an area of the data and calculates a parity on the basis of the aforementioned code. The ECC circuit 207 transfers the data stored in the memory buffer 102 together with the parity calculated at the BCH encoder to the flash interface 108, thereby writing the data into the flash memory 109.

If the number of bits per symbol is set to 3, a symbol is allocated to a cell. To increase the encoding ratio by increasing the number of bits per symbol, for example, a symbol may be allocated to 4 cells=12 bits.

First, according to a command from the host device 200, the threshold values of page L, page M, and page U belonging to a word line WL read from the flash memory 109 are determined. In this case, only hard bits (HB) are determined.

As shown in FIG. 17, a hard bit (HB) on each page is determined using seven types of voltages, V01, V02, V03, V04, V05, V06, and V07.

As described above, the ECC circuit 207 reads three pages (L, M, U) in a cell belonging to the same word line WL, determines the threshold value (program value) of the cell, and calculates a syndrome. If the syndrome is not zero, the ECC circuit 207 makes a correction. The ECC circuit 207 performs a cell ECC (BCH) operation using parities calculated in units of one or more cells stored on page L, page M, and page U.

Operational Advantages of the Memory System According to the Second Embodiment With the second embodiment, even if two or more bit errors have occurred when a threshold value has fluctuated beyond an adjacent area, they can be corrected. Even in a memory system where a threshold value fluctuates severely, the correcting capability will not decrease.

When an ECC operation is performed using BCH codes, if a threshold value shifts beyond an adjacent threshold area, a plurality of bit errors might occur, possibly exceeding the number of correctable bits.

As shown in FIG. 18, the threshold value of a memory cell in which data at level Er has been stored might have shifted to level Er" that overlaps with an adjacent threshold area. In this way, when the level of the memory cell exceeds an adjacent threshold level and further shifts to a next but one threshold level, a plurality of bit errors will occur. If such errors have occurred, ECC (BCH) using page parity might allow the number of correctable bits to be exceeded.

However, with the second embodiment, since a parity is created for each cell, even if a large threshold fluctuation has taken place as shown in FIG. 8, a plurality of bit errors do not occur, enabling the risk of exceeding the number of correctable bits to be suppressed.

While in the first embodiment, a code corresponding to an area number is only 0 or 1 as shown in FIG. 7, the second embodiment prepares as many codes as there are area numbers. When a threshold value has moved from area number 0 to area number 2 as shown in FIG. 7, the code moves from a 0 area to another 0 area in the first embodiment. Therefore, actually, such an error might not be detected. However, when an area number and a code coincide with each other as in the second embodiment, there is no such a risk.

Third Embodiment

Next, a third embodiment will be explained. The basic configuration and basic operation of a memory system according to the third embodiment are the same as those of the memory system according to the second embodiment described above. Therefore, an explanation of the matters explained in the second embodiment and matters easily inferred from the second embodiment will be omitted.

Encoding

In the third embodiment, an area at level Er to level G is divided into 24 parts redundantly and the numbers of the 24 divided areas are encoded. In what area the threshold value of a cell lies is determined using soft bits (SB). From this information, a syndrome is calculated, finding an error position and an error value.

Figure 19:
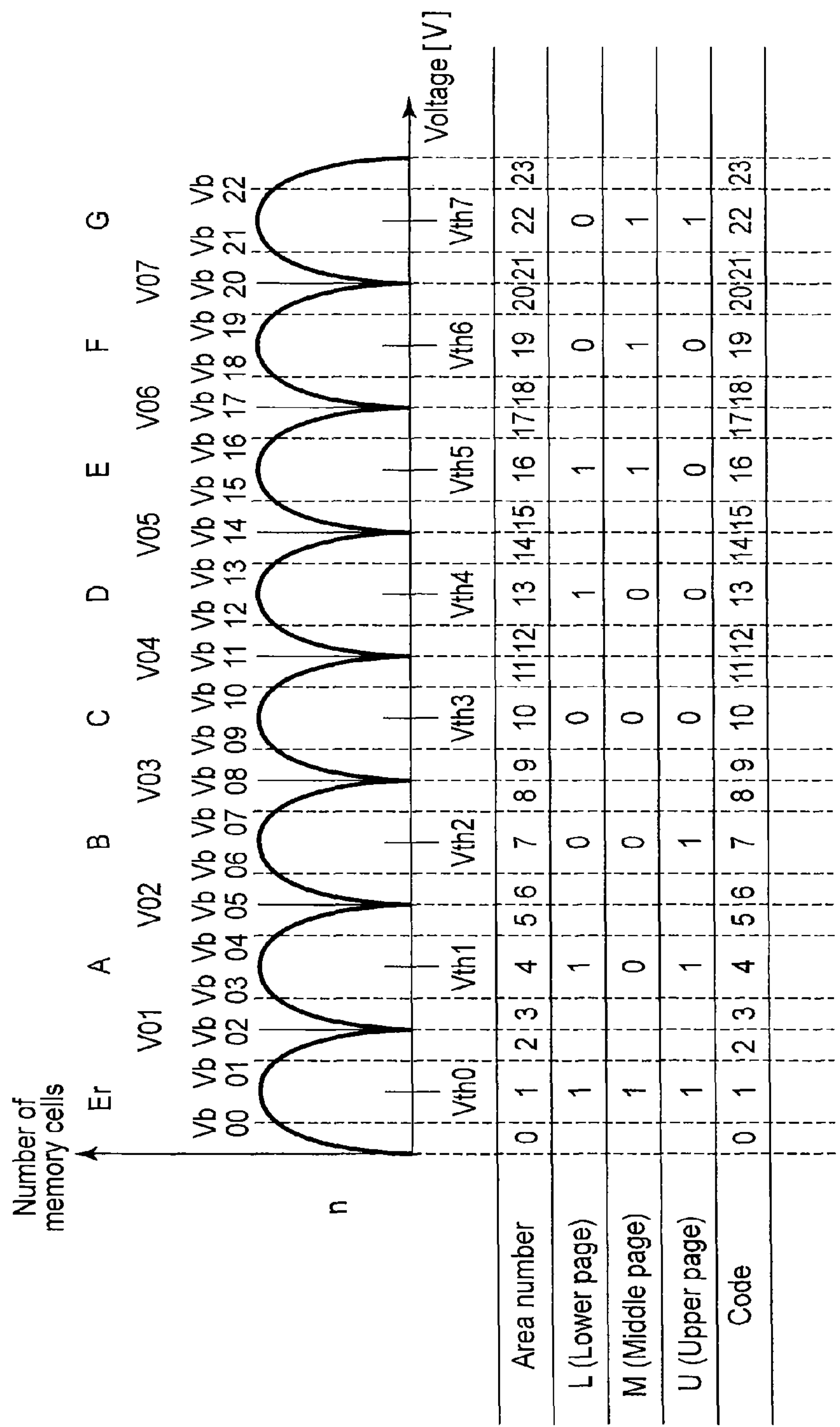
FIG. 19 is a graph to explain encoding according to a third embodiment.

As shown in FIG. 19, three area numbers are allocated to each of the areas corresponding to level Er to level G of a memory cell transistor MT. Specifically, area numbers 0, 1, and 2 are allocated to level Er. Area numbers 3, 4, and 5 are allocated to level A. Area numbers 6, 7, and 8 are allocated to level B. Area numbers 9, 10, and 11 are allocated to level C. Area numbers 12, 13, and 14 are allocated to level D. Area numbers 15, 16, and 17 are allocated to level E. Area numbers 18, 19, and 20 are allocated to level F. Area numbers 21, 22, and 23 are allocated to level G.

The values of a lower page, a middle page, and an upper page corresponding to each level are the same as in FIG. 17. A code allocated to each level is the same as the corresponding area number.

To read soft bits (SB), it is necessary to apply 23 voltages, Vb00 to Vb22, to the corresponding memory cells.

The ECC circuit 207 includes, for example, a table where an area is specified for each threshold distribution of data in a memory cell as described above. Having received write data from the host device 200, the ECC circuit 207 determines an area of the data and calculates a parity on the basis of the aforementioned code. The ECC circuit 207 transfers the data stored in the memory buffer 102 together with the parity calculated at the BCH encoder to the flash interface 108, thereby writing the data into the flash memory 109.

The memory system of the third embodiment performs the same cell ECC (BCH) operation as the one explained in the second embodiment, enabling the same ECC operation as the one explained in the second embodiment to be performed.

Furthermore, for example, if a cell supposed to be written in area number 4 has been written in area number 3 or 5 by mistake, a bit read error will not occur. In other words, in a hard bit (HB) decision, it will not be determined to be an error. However, when the threshold value is shifted from area number 4, the ECC circuit 207 determines that the cell is a latent defective cell. That is, the ECC circuit 207 can sense beforehand that the threshold value is shifted from the threshold value at the time of writing.

For example, when not less than a specific number of latent defective cells have occurred, the ECC circuit 207 can detect a page that includes latent defective cells before a threshold fluctuation possibly causing bit errors actually occurs. For example, when the number of latent defective cells has exceeded a specific number in an erase block, a control module in the NAND controller moves the erase block data to another erase block by using the detection information. This makes it possible to realize a higher-reliability memory.

Operational Advantages of the Memory System According to the Third Embodiment

Generally, in an ECC operation, a bit error is detected or corrected. In other words, an ECC operation detects a cell that has actually malfunctioned and corrects it. Therefore, it was impossible to detect a latent defective cell and move data to another page before the latent defective cell actually made an error.

However, the third embodiment can not only correct an error as in the second embodiment but also determine in what area the threshold value of a cell lies using soft bits (SB) and detect a latent defective cell. Therefore, it is possible to move data to another page before the latent defective cell actually makes an error.

While in the third embodiment, the area at level Er to level G has been divided into 24 parts redundantly and the numbers of the 24 divided areas have been encoded, this is illustrative only. The division number may be changed as needed.

In addition, while in the third embodiment, area numbers have been encoded and a parity has been created on the basis of the codes, this is illustrative only. Area numbers may be encoded directly on the basis of program values of cells (3-bit held data in cells).

Fourth Embodiment

Next, a fourth embodiment will be explained. The basic configuration and basic operation of a memory system according to the fourth embodiment are the same as those of the memory system according to the first embodiment described above. Therefore, an explanation of the matters explained in the first embodiment and matters easily inferred from the first embodiment will be omitted.

Next, a method of storing data in the memory cell array 11 will be explained with reference to FIG. 20. FIG. 20 is a schematic view of a data area for a word line WL. As shown in FIG. 20, the data area includes a normal data area and an ECC data area.

In a general memory system, three bits in a cell are assigned to three pages, page L, page M, and page U. In a memory system of the fourth embodiment, a page includes a normal data area and a cell parity area as shown in FIG. 20. The normal data area includes a lower page storage area, a middle page storage area, and an upper page storage area. That is, the CPU 103 assigns data on page L, page M, and page U to the same page. As a result, reading only one page enables cell program information to be acquired. Using this information, an ECC operation can be performed efficiently.

Operational Advantages of the Memory System According to the Fourth Embodiment

Normally, in a memory system where three bits are stored in a cell, three bits are assigned to different three pages (lower, middle, and upper pages). Bits in a unit cell are assigned to a plurality of pages, causing the problem of increasing the average read time.

With the fourth embodiment, however, data supposed to be allocated to different three pages is allocated to one page, enabling page reading itself to be made faster.

Modifications

In the first and second embodiments, the memory system capable of detecting and correcting hard error (HE) cells easily has been explained. Traditionally, to correct hard error (HE) cells, it has been desirable that the host device 200 should have an expected value for correcting hard error (HE) cells. However, in the memory system according to each of the above embodiments, the host device 200 need not have an expected value for correcting hard error (HE) cells and can detect and correct hard error (HE) cells. This is particularly effective when the original data has not been stored in the host device 200.

While in each of the above embodiments, area numbers have been encoded and a parity has been created on the basis of the codes, this is illustrative only. Area numbers may be encoded directly using the threshold values of cells (program values).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:

a plurality of nonvolatile memory cells with a plurality of pages;

a memory module which comprises a plurality of nonvolatile memory cells with a plurality of pages and line-and-space word lines to which more than one of the memory cells are connected; and a controller which receives write data from a host device, creates an error correction code in units of one or more of the memory cells based on the write data stored in the memory cells, adds the error correction code to the write data, stores the error-correction-code-added write data in the memory module, and makes an error correction of the error-correction-code-added data supplied from the memory module by using the error correction code, wherein the controller comprises a table where a plurality of areas are specified for each threshold distribution of data in the memory cells and creates the error correction code for each of the memory cells based on the write data stored in the memory cells and the table.

2. The memory system of claim 1, wherein the table is such that numbers are allocated to the areas in ascending order of threshold voltage and the codes of the areas correspond to the numbers of the areas, and the controller creates the error correction code for each of the memory cells based on the write data stored in the memory cells and the codes.

3. The memory system of claim 2, wherein the controller, if it determines in the error correction that the data is the same as that at the time of reception from the host device and has shifted to a different area, treats a memory cell that stores the data as a latent defective memory cell.

4. The memory system of claim 2, wherein the controller, if it detects more than a specific number of latent defective memory cells on more than one of the word lines comprised in the same erase block, moves all the data stored in the memory cells belonging to the same erase block to memory cells belonging to another erase block.

5. The memory system of claim 1, wherein the page comprises a first area which stores write data provided by the host device, and a second area which stores an error correction code encoded based on data stored in the first area.

* * * * *